United States Patent
Takemoto et al.

(10) Patent No.: US 10,119,879 B2
(45) Date of Patent: Nov. 6, 2018

(54) STRAIN SENSOR

(71) Applicant: DENSO CORPORATION, Kariya, Aichi-pref. (JP)

(72) Inventors: Shoichi Takemoto, Kariya (JP); Shuichi Nakano, Kariya (JP); Nobuyuki Abe, Kariya (JP); Kenji Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 27 days.

(21) Appl. No.: 15/498,768

(22) Filed: Apr. 27, 2017

(65) Prior Publication Data

US 2017/0315013 A1 Nov. 2, 2017

(30) Foreign Application Priority Data

Apr. 27, 2016 (JP) .................................. 2016-089829

(51) Int. Cl.
*G01L 23/10* (2006.01)

(52) U.S. Cl.
CPC .................................... *G01L 23/10* (2013.01)

(58) Field of Classification Search
CPC .............. F23Q 2007/002; G01M 15/08; F02D 35/023; F02P 19/028; G01L 23/10; F02B 77/085
See application file for complete search history.

(56) References Cited

U.S. PATENT DOCUMENTS

| 6,539,787 | B1 | 4/2003 | Murai et al. | |
| 8,950,247 | B2* | 2/2015 | Borgers | G01M 15/08 |
| | | | | 73/114.18 |
| 8,978,454 | B2* | 3/2015 | Pottiez | G01L 23/04 |
| | | | | 73/114.18 |
| 9,063,031 | B2* | 6/2015 | Zwollo | G01M 15/08 |
| 9,347,854 | B2* | 5/2016 | Nishiyuki | G01M 15/08 |
| 9,874,195 | B2* | 1/2018 | Wolff | F23Q 7/001 |

FOREIGN PATENT DOCUMENTS

| JP | 2007-198169 | 8/2007 |
| JP | 2014-048045 | 3/2014 |
| JP | 2014-084800 | 5/2014 |
| JP | 2015-152274 | 8/2015 |
| JP | 2016-017490 | 2/2016 |

* cited by examiner

*Primary Examiner* — Freddie Kirkland, III
(74) *Attorney, Agent, or Firm* — Nixon & Vanderhye PC

(57) ABSTRACT

A strain sensor is provided which includes a strain sensor, a first housing, a second housing joined to the first housing, and a pressure measuring mechanism firmly retained between the first housing and the second housing. The pressure measuring mechanism is gripped between a first face of the first housing and a second face of the second housing to measure compressive stress exerted by a cylinder head of an internal combustion engine on the first housing and the second housing. This structure improves the reliability of mechanical strength of the housings and the pressure measuring mechanism and provides flexibility in selecting the type of the pressure measuring mechanism.

12 Claims, 22 Drawing Sheets

STRAIN SENSOR

CROSS REFERENCE TO RELATED DOCUMENT

The present application claims the benefit of priority of Japanese Patent Application No. 2016-89829 filed on Apr. 27, 2016, the disclosure of which is incorporated herein by reference.

BACKGROUND

1 Technical Field

The invention relates generally to a strain sensor which measures a compressive strain occurring in a given object.

2 Background Art

For instance, combustion pressure sensors for use in measuring the pressure in a combustion chamber of an internal combustion engine in which fuel is being combusted (which will also be referred to as a combustion pressure below) are known as strain sensors. Japanese Patent First Publication No. 2007-198169 discloses a combustion pressure sensor which includes a housing with a front end and a rear end (which will also be referred to as a base end below). The installation of the combustion pressure sensor in the internal combustion engine is achieved by placing the front end of the housing in contact with a bottom of a mount hole formed in the internal combustion engine and also placing an external thread of the based end of the housing in engagement with an internal thread formed in the mount hole of the internal combustion engine. The housing has disposed therein a center shaft which has an end placed in contact with the front end of the housing. The center shaft is moved following deformation of the mount hole in an axial direction thereof. A pressure measuring mechanism (i.e., a sensor) which measures the combustion pressure is disposed on the base end of the center shaft. A nut is also fastened to the base end of the center shaft. In installation of the combustion pressure sensor in the housing, the pressure measuring mechanism is held between the housing and the nut tightened on the center shaft.

The installation of the above combustion pressure sensor in the mount hole of the housing is, as described above, achieved by placing the front end of the housing in contact with the bottom surface of the mount hole and engaging the external thread formed in the base end of the housing with the internal thread formed in the mount hole. This causes an interval between the front end of the housing and the external thread of the housing to be shortened, so that a compressive stress acts on the housing in the form of precompression. In use, a compressive stress which arises from the combustion pressure and occurs in the engine head is usually added to the housing in addition to the precompression, so that an absolute value of the compressive stress acting on the housing will become great, thus blocking improvement of the reliability of the housing. The increase in mechanical strength of the housing usually requires an increase in size of the housing, thus resulting in a difficulty in decreasing the size of the combustion pressure sensor.

The compressive stress exerted on the housing upon installation of the combustion pressure sensor in the mount hole is also added to the center shaft, thereby causing the nut to be urged away from the pressure measuring mechanism, so that the compressive stress which has been added to the pressure measuring mechanism upon installation to the housing is released. When the compressive stress occurs in the engine head due to the combustion pressure, the compressive stress added to the pressure measuring mechanism is further released, thus resulting in a great variation in the stress exerted on the pressure measuring mechanism. This obstructs the improvement of the strength reliability of the pressure measuring mechanism. The great variation in the stress requires the pressure measuring mechanism to have a wide range in which the pressure is measurable, thereby limiting selection of the type of the pressure measuring mechanism.

SUMMARY

It is therefore an object to provide a strain sensor which is designed to have improved strength reliability of a housing and a pressure measuring mechanism and also have flexibility in selecting the type of the pressure measuring mechanism.

According to one aspect of the invention, there is provided a strain sensor which is installed in a mount hole formed in a measuring target to measure a compressive strain occurring in the measuring target. The strain sensor has a length with a base end side and a front end side opposed to each other in an axial direction thereof. The strain sensor comprises: (a) a first housing which has a length with a base end side and a front end side opposed to each other, the base end side being closer to an opening of the mount hole, the front end side being closer to a bottom of the mount hole, the first housing having a head which is formed on the base end side and placed on an end surface of the measuring target; (b) a second housing which has a length with a base end side and a front end side opposed to each other, the base end side being closer to the opening of the mount hole, the front end side being closer to the bottom of the mount hole, the second housing being located closer to the front end side of the strain sensor than the first housing is and joined to the first housing, the second housing being in engagement with a thread formed in the mount hole; and (c) a pressure measuring mechanism which is nipped by the first housing and the second housing, the pressure measuring mechanism having a base end side closer to the base end side of the strain sensor and a front end side closer to the front end side of the strain sensor.

The first housing has a first end portion located on the front end side thereof. The first end portion has a first face facing a front end surface of the pressure measuring mechanism which is located on the front end side of the pressure measuring mechanism.

The second housing has a second end portion located on the base end side thereof. The second end portion has a second face facing a base end surface of the pressure measuring mechanism which is located on the base end side of the pressure measuring mechanism.

The pressure measuring mechanism is nipped between the first face and the second face and works to measure a change in compressive stress exerted by the measuring target on the first housing and the second housing in the axial direction of the strain sensor.

The strain sensor is designed to have the pressure measuring mechanism which is firmly nipped between the first face of the first housing and the second face of the second housing with an increase in interval between the first housing and the second housing. The direction in which the stress acts on the first and second housings is opposite that in which the stress acts on the pressure measuring mechanism.

The strain sensor in which the pressure measuring mechanism is arranged between the first and second housings is installed in the mount hole of the measuring target. Such installation is achieved by threadably fastening or turning the strain sensor into engagement with the thread in the mount hole. After the head of the first housing reaches the end surface of the measuring target, the turning of the strain sensor will cause the second housing to be rotated so that it advances toward the bottom of the mount hole until a thread ridge surface of an external thread of the second housing which faces the bottom of the mount hole contacts a thread ridge surface of the thread of the mount hole.

The advancement of the second housing in the mount hole will cause the second housing to leave the first housing, so that the tensile stress is exerted on the first housing and the second housing, thereby firmly holding the pressure measuring mechanism between the first face of the first housing and the second face of the second housing. The development of the tensile stress results in exertion of compressive stress on the pressure measuring mechanism through the first face and the second face. In this way, the installation of the strain sensor in the measuring target will create the tensile stress exerted on the first housing and the second housing and the compressive stress exerted on the pressure measuring mechanism. The tensile stress and the compressive stress are kept as they are after the strain sensor is installed in the measuring target.

When the strain sensor in a measuring operation to measure the compressive stress, and when the measuring target is compressed, it will cause the second housing which threadably engages the measuring target to be urged toward the first housing, thereby creating stress acting on the first housing and the second housing. This partially releases the tensile stress which has already acted on the first housing and the second housing after the strain sensor is installed in the measuring target. The absolute value of the stress acting on the first housing and the second housing, therefore, becomes small. This results in a decrease in required degree of mechanical strength of the first housing and the second housing, thereby enhancing the reliability of the strength of the first housing and the second housing. This enables the size of the first housing and the second housing to be decreased to decrease the overall size of the strain sensor.

When the compressive stress is being exerted on the first housing and the second housing in the measuring operation of the strain sensor, the tensile stress will be exerted on the pressure measuring mechanism retained by the first face and the second face, thereby partially releasing the compressive stress which has been exerted on the pressure measuring mechanism upon installation of the strain sensor in the measuring target. The absolute value of the stress acting on the pressure measuring mechanism, therefore, becomes small. This results in a decrease in required degree of mechanical strength of the pressure measuring mechanism, thereby enhancing the reliability of the strength of the pressure measuring mechanism. A variation in stress acting on the pressure measuring mechanism is also decreased, thereby enabling a required range in which the pressure measuring mechanism measures the compressive stress to be decreased, thereby enlarging the range of selection of the type of the pressure measuring mechanism.

As apparent from the above discussion, the structure of the strain sensor has the improved reliability of mechanical strength of the housings and the pressure measuring mechanism and the wide range of selection of the type of the pressure measuring mechanism.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

The strain sensor 1 according to the first embodiment will be described below with reference to FIGS. 1 to 6.

Figure 1:
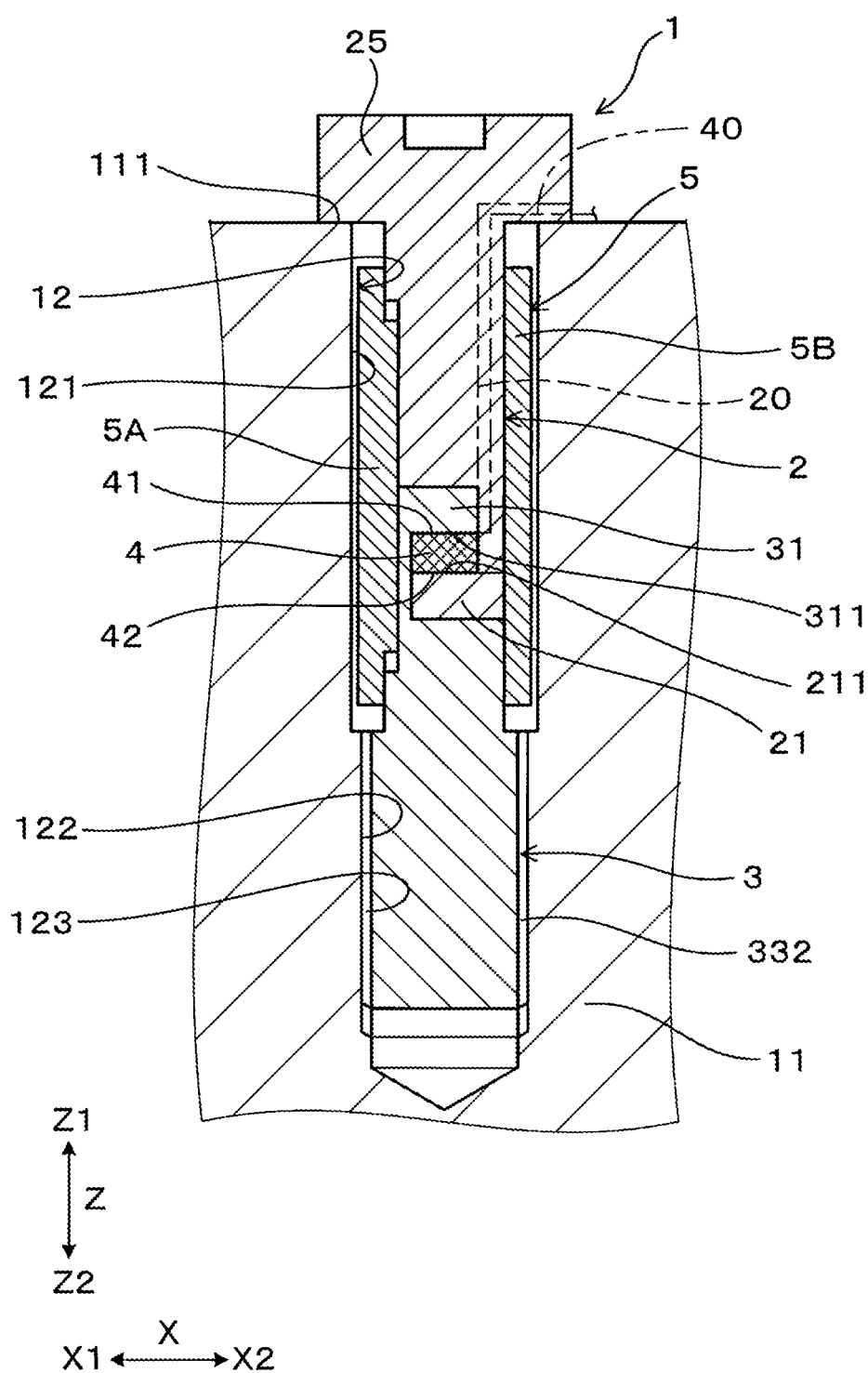
FIG. 1 is a longitudinal sectional view which illustrates a strain sensor of the first embodiment which is installed in a measuring target such as a cylinder head of an internal combustion engine.

The strain sensor 1 is, as illustrated in FIG. 1, installed in the mount hole 12 with a bottom formed in the cylinder head 11 that is a measuring target. The strain sensor 1 works to measure the degree of compressive strain occurring in the cylinder head 11.

In the following discussion about the strain sensor 1, a direction parallel to a longitudinal center line of the mount hole 12 will be referred to as an axial direction Z. A region where there is an opening of the mount hole 12 in the axial direction Z of the strain sensor 1 will also be referred to as an opening side of the mount hole 12 or a base end side Z1, while a region where there is a bottom of the mount hole 12 in the axial direction Z of the strain sensor 1 will be referred to as a front end side Z2. The base end side Z1 and the front end side Z2 are also used for specifying locations of portions of each component of the strain sensor 1 in the axial direction Z or such portions themselves and also referred to, respectively, as a first end or a first end side and a second end or a second end side of each component of the strain sensor 1 which are opposed to each other in the axial direction Z of the strain sensor 1. The opening side of the mount hole 12 is a portion of the mount hole 12 into which the strain sensor 1 is inserted when installed in the cylinder head 11.

Figure 3:
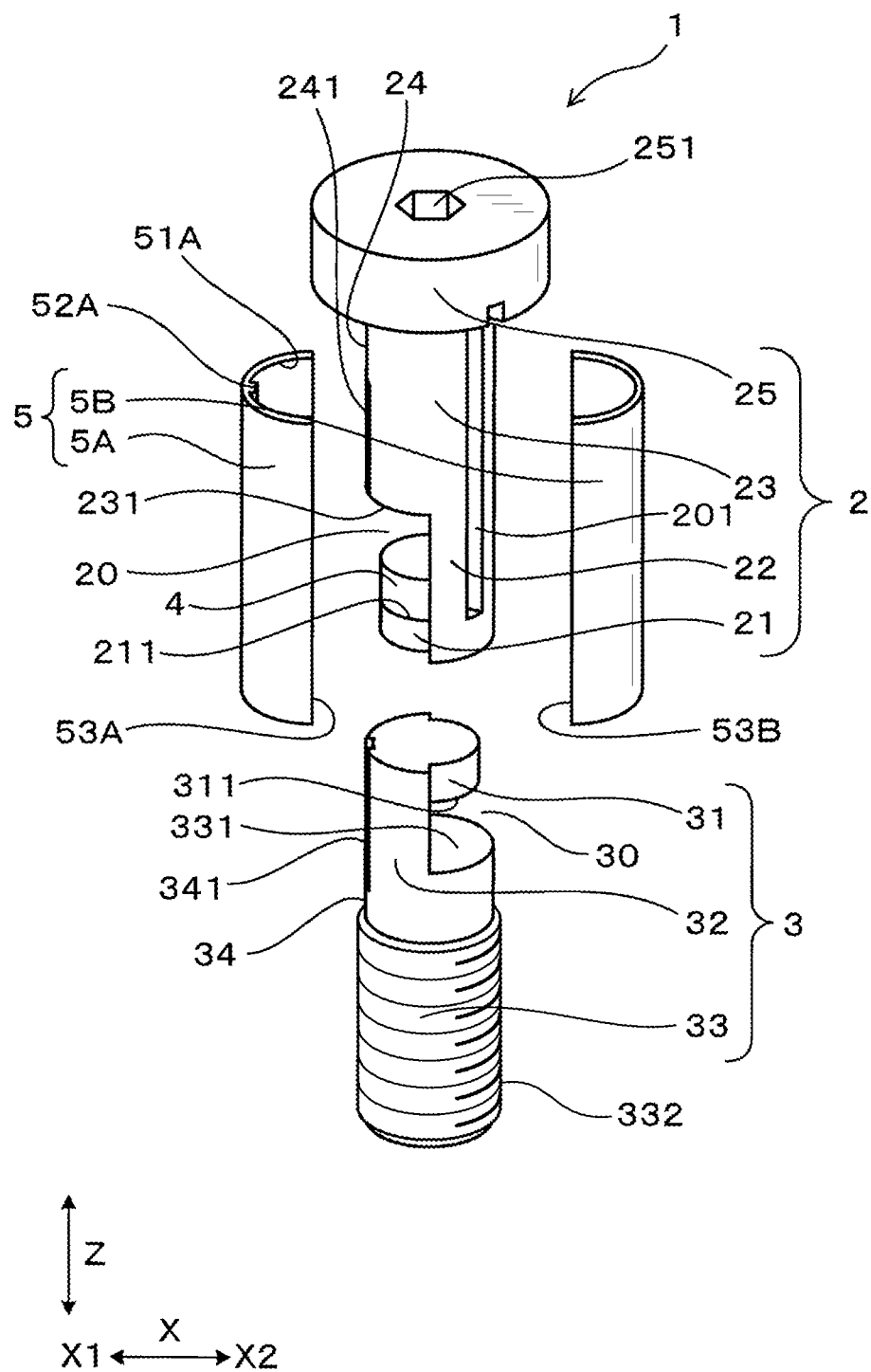
FIG. 3 is a perspective development view which illustrates an entire structure of a strain sensor of the first embodiment.

The strain sensor 1, as clearly illustrated in FIGS. 1 and 3, has a given length with a first end (i.e., the base end side Z1) and a second end (i.e., the front end side Z2) opposed to each other. The strain sensor 1 includes the first housing 2, the second housing 3 joined to the first housing 2 to form a sensor housing, and the pressure measuring mechanism 4 disposed between the first housing 2 and the second housing 3. The first housing 2 is located at the base end side Z1 of the strain sensor 1. The mount hole 12 is made up of the upper hole 121 and the lower hole 122 which is located more deeply than the upper hole 121. The first housing 2 is disposed inside the upper hole 121 of the mount hole 12. The first housing 2 has the head 25 placed on the end surface 111 of the cylinder head 11. The second housing 3 is located at the front end side Z2 of the strain sensor 1 and disposed in the lower hole 122 of the mount hole 12. The second housing 3 is fastened to the internal thread 123 formed in a wall of the lower hole 122.

The first housing 2 has the first end portion 21 which is located at the front end side Z2 thereof. The first end portion 21 has the first face 211 which faces the front end surface 42 of the pressure measuring mechanism 4 which is located at the front end side Z2 of the pressure measuring mechanism 4. The second housing 3 has the second end portion 31 which is located at the base end side Z1 thereof. The second end portion 31 has the second face 311 which faces the base end surface 41 of the pressure measuring mechanism 4 which is located at the base end side Z1 of the pressure measuring mechanism 4. The pressure measuring mechanism 4 is held between the first face 211 and the second face 311 to measure a change in compressive stress exerted by the cylinder head 11 both on the first housing 2 and on the second housing 3 in the axial direction Z. In other words, the pressure measuring mechanism 4 works to sense the compressive stress, as added from the cylinder head 11 to the first housing 2 and the second housing 3 in the axial direction Z, in units of pressure.

Figure 2:
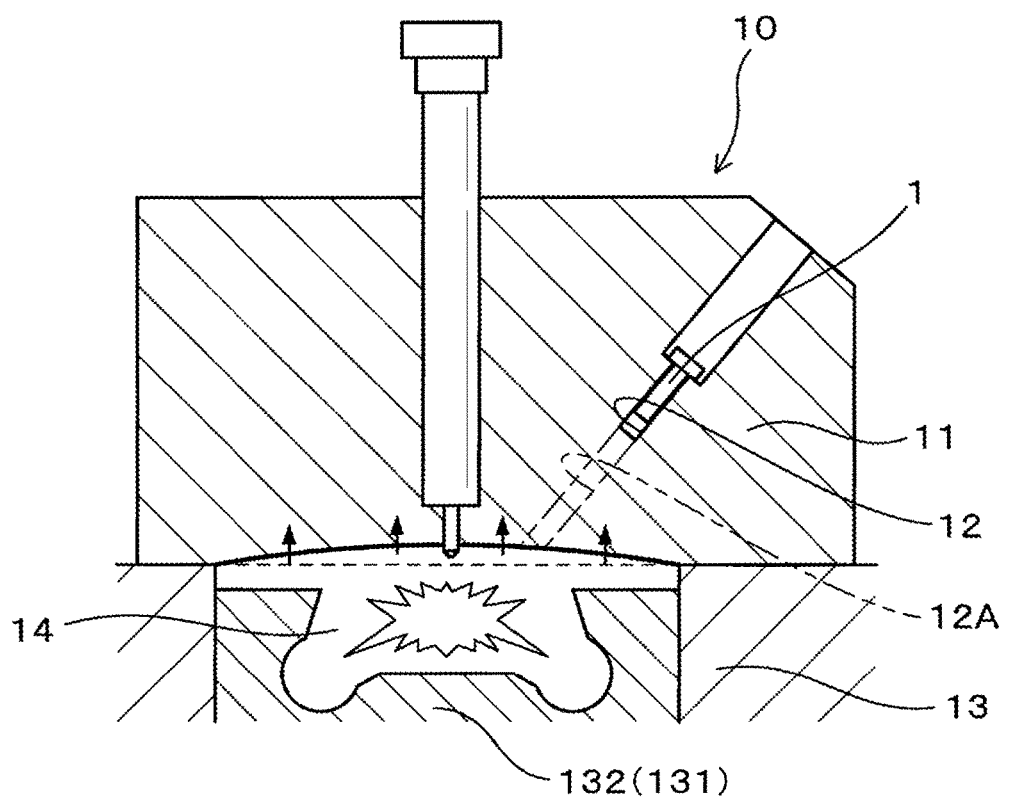
FIG. 2 is a partially longitudinal sectional view which illustrates a region around the measuring target in which the strain sensor of FIG. 1 is installed.

The cylinder head 11 is, as illustrated in FIG. 2, a part of the internal combustion engine 10. Specifically, the internal combustion engine 10 includes the cylinder block 13, the piston 132 disposed in the cylinder 131 of the cylinder block 13, and the cylinder head 11 which defines the combustion chamber 14 along with the piston 132 and the cylinder block 13. The mount hole 12 is formed in the cylinder head 11 adjacent the combustion chamber 14 without directly communicating with the combustion chamber 14. The strain sensor 1 is responsive to the compressive stress occurring in the cylinder head 11 to determine the combustion pressure in the combustion chamber 14. In other words, the strain sensor 1 measures the combustion pressure as a function of a degree of the compressive stress occurring in the internal combustion engine 10.

The first housing 2, as can be seen in FIG. 3, has the first extended portion 22 which extends from a major body of the first housing 2 toward the front end side Z2. The first end portion 21 is, as illustrated in FIGS. 1 and 3, retained in the form of a cantilever by a front end of the first extended portion 22 which faces the front end side Z2 of the strain sensor 1. Specifically, the first end portion 21 extends from the first extended portion 22 in the first lateral direction X1 perpendicular to the axial direction Z. The second housing 3 has the second extended portion 32 which extends from a major body of the second housing 3 toward the based end side Z1. The second end portion 31 of the second housing 3 is retained in the form of a cantilever by a base end of the second extended portion 32 which faces the base end side Z1 of the strain sensor 1. Specifically, the second end portion 31 extends from the second extended portion 32 in the second lateral direction X2 that is opposite the first lateral direction X1.

The first housing 2 and the second housing 3 are assembled integrally with the hollow cylindrical housing cover 5. The housing cover 5 surrounds entire circumferences of outer peripheries of the first housing 2 and the second housing 3 and serves as a protector to shield the pressure measuring mechanism 4. The housing cover 5 is made up of two half-pipe shaped discrete members: cover semicylinders 5A and 5B in order to facilitate the ease with which the housing cover 5 is assembled with the first housing 2 and the second housing 3. The cover semicylinders 5A and 5B each have a length extending in the axial direction Z of the strain sensor 1 and have edges which face each other in the lateral direction X perpendicular to the axial direction Z and are, as will be described later in detail, joined together to complete the housing cover 5.

The cover semicylinder 5A, as illustrated in FIG. 3, has the inner peripheral surface 51A on which the protrusion 52A is formed in the form of a rail. The protrusion 52A extend continuously in the axial direction Z. The first housing 2 has the outer peripheral surface 24 in which the first recess 241 is formed in the shape of a groove. The first recess 241 extends continuously in the axial direction Z. The protrusion 52A of the cover semicylinder 5A is fit in the first recess 241. Similarly, the second housing 3 has the outer peripheral surface 34 in which the second recess 341 is formed in the shape of a groove. The second recess 341 extends continuously in the axial direction Z in alignment with the first recess 241. The protrusion 52A of the cover semicylinder 5A is fit in the second recess 341. Specifically, the protrusion 52A are fit both in the first and second recesses 241 and 341 to stop the first housing 2 and the second housing 3 from rotating relative to each other.

The structure of the strain sensor 1 will be described below in more detail.

The depth of the mount hole 12 of the cylinder head 11 is greater than a distance between an end surface of the first housing 2 which is placed in contact with the end surface 111 (i.e., an upper surface) of the cylinder head 111 and a front end (i.e., a lower end, as viewed in FIG. 1) of the second housing 3. The internal thread 123 formed on the inner wall of the lower hole 122 of the mount hole 12 has an end located more deeply than a region where the internal thread 123 engages the external thread 322 formed on an outer wall of the second housing 3.

The strain sensor 1 of this embodiment is designed so that when the strain sensor 1 is installed in the mount hole 12 by engaging the external thread 332 of the second housing 3 with the internal thread 123 of the mount hole 12, the external thread 332 is further tightened after the first housing 2 contacts with the end surface 111 of the mount hole 12 located on the base end side Z1, so that the second housing 3 is urged away from the first housing 2 in the axial direction Z, thereby creating a mechanical grip which tightly holds the pressure measuring mechanism 4 between the first face 211 of the first housing 2 and the second face 311 of the second housing 3.

Specifically, the strain sensor 1 is engineered so that when the strain sensor 1 is installed in the mount hole 12 of the cylinder head 11, tensile stress is developed between the first housing 2 and the second housing 3, so that compressive stress is created by the first end portion 21 of the first housing 2 and the second end portion 31 of the second housing 3 and exerted on the pressure measuring mechanism 4. Therefore, when the strain sensor 1 is subjected to the combustion pressure generated in the internal combustion engine 10, it will cause the tensile stress acting on the first and second housings 2 and 3 to be decreased, thereby decreasing the degree of compressive stress acting on the pressure measuring mechanism 4. Using this fact, the strain sensor 1 measures or determines the combustion pressure in the internal combustion engine 10.

The first housing 2, as illustrated in FIG. 3, includes the first body 23, the semi-cylindrical first extended portion 22 which extends from the first body 23 to the front end side Z2, the first end portion 21 secured to the front end side Z2 of the first extended portion 22, and the first head 25 disposed on the base end side Z1 of the first body 23. The first head 25 has a diameter greater than that of the first body 23 and contacts with a portion of the end surface 111 of the cylinder head 11 around the mount hole 12 when the strain sensor 1 is installed in the mount hole 12. The outer peripheral surface 24 of the first body 23 has formed therein the first recess 241 in which the protrusion 52A formed on the cover semicylinder 5A is fit. The first head 25 has formed therein on the base end side Z1 the first bore or socket 251 in which a fastening tool, such as a hexagonal wrench, is fit. The first housing 2 is of an L-shape defined by the first end portion 21 and the first extended portion 22.

The second housing 3, as illustrated in FIG. 3, includes the second body 33 on which the external thread 332 is formed which engages the internal thread 123 formed on the inner wall of the lower hole 122 of the mount hole 12, the second semi-cylindrical extended portion 32 extending from the second body 33 toward the base end side Z1, and the second end portion 31 which is formed on the base end side Z1 of the second extended portion 32. The second recess 341 is formed in the outer peripheral surface 34 of the second end portion 31 and the second extended portion 32. The protrusion 52A of the cover semicylinder 5A is fit in the second recess 341. The second housing 3 is of an L-shape defined by the second end portion 31 and the second extended portion 32.

The pressure measuring mechanism 4 is an assembly of a piezoelectric device made from crystal, PZT, lithium niobate, or polyvinylidene fluoride and an insulator with which the piezoelectric device is covered. The pressure measuring mechanism 4, as illustrated in FIG. 1, has conductive wires 40 disposed in the grooves 201 formed in the first housing 2. The conductive wires 40 and the grooves 201 are indicated by two-dot chain lines in FIG. 1. The piezoelectric device works to convert pressure applied thereto into an electrical charge. FIG. 1 schematically illustrates the pressure measuring mechanism 4.

When the cover semicylinders 5A and 5B are, as can be seen in FIG. 3, installed on the first housing 2 and the second housing 3 in assembling of the strain sensor 1, the circumferential end surfaces 53A of the cover semicylinder 5A are joined or welded to the circumferential end surfaces 53B of the cover semicylinder 5B. The first housing 2 and the second housing 3 are not joined to the cover semicylinders 5A and 5B so that the first housing 2 and the second housing 3 are movable relative to the housing cover 5 (i.e., the cover semicylinders 5A and 5B) in the axial direction Z. The cover semicylinders 5A and 5B may alternatively be joined to the first housing 2 or the second housing 3.

The assembling or installation of the strain sensor 1 will be described below in detail.

Figure 4:
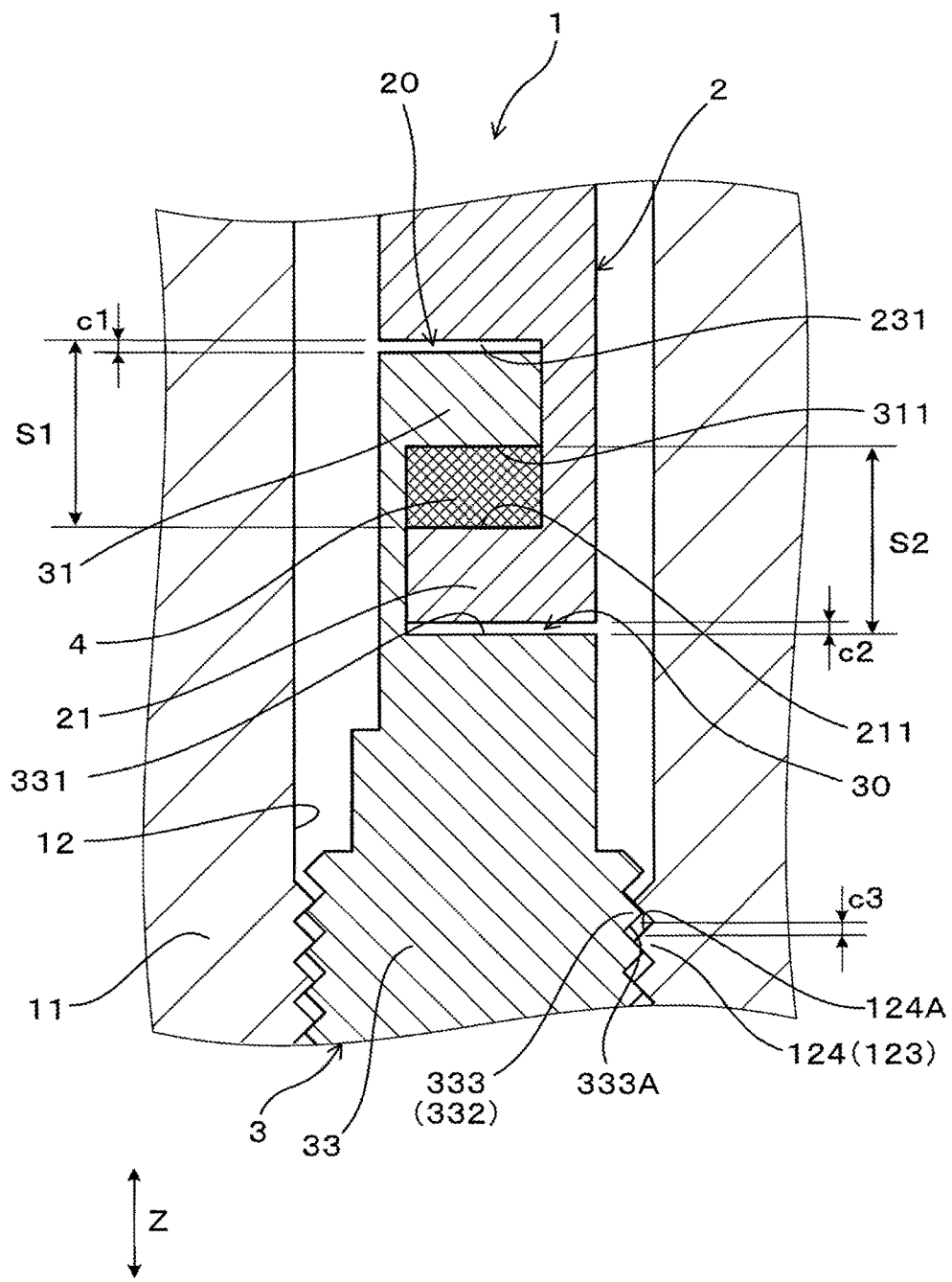
FIG. 4 is partially enlarged longitudinal sectional view which illustrates a region around a pressure measuring mechanism of a strain sensor in the first embodiment.

FIG. 4 is a view which illustrates the strain sensor 1 after being assembled. FIG. 4 omits the housing cover 5 for the sake of simplicity. The first housing 2 has the first face 211 and the face 231 opposed to the first face 211. The first housing 2 has a cavity or chamber (which will be referred to below as a first chamber 20) formed between the first face 211 and the face 231 and in which the pressure measuring mechanism 4 and the second end portion 31 are disposed. The axial length S1 of the first chamber 20 along the axial direction Z is selected to be greater than the sum of the thickness of the pressure measuring mechanism 4 in the axial direction Z and the thickness of the second end portion 31 in the axial direction Z in order to facilitate the assembling of the strain sensor 1, thus resulting in the gap c1 between the face 231 of the first housing 2 and the second end portion 31 within the first chamber 20.

Similarly, the second housing 3 has the second face 311 and the face 331 opposed to the second face 311. The second housing 3 has a cavity or chamber (which will be referred to below as a second chamber 30) formed between the second face 311 and the face 331 and in which the pressure measuring mechanism 4 and the first end portion 21 are disposed. The axial length S2 of the second chamber 30 along the axial direction Z is selected to be greater than the sum of the thickness of the pressure measuring mechanism 4 in the axial direction Z and the thickness of the first end portion 21 in the axial direction Z in order to facilitate the assembling of the strain sensor 1, thus resulting in the gap c2 between the face 331 of the second housing 3 and the first end portion 21 within the second chamber 30. The gap c3 is also formed between each of thread ridges 333 of the external thread 332 of the second body 33 of the second housing 3 and a corresponding one of the thread ridges 124 of the internal thread 123 of the mount hole 12 in order to facilitate relative spiral rotation of the threads 332 and 123.

The strain sensor 1 is designed to use a relation among the sizes of the gaps c1, c2, and c3 to hold the pressure measuring mechanism 4 between the first face 211 of the first housing 2 and the second face 311 of the second housing 3. Specifically, the first chamber 20 of the first housing 2 and the second chamber 30 of the second housing 3 are designed to have the gaps c1 and c2 which are smaller than the gap c3.

In assembling of the strain sensor 1, the installation of the strain sensor 1 in the mount hole 12 is achieved by placing the strain sensor 1 in the mount hole 12 and then turning the strain sensor 1 around the center axis thereof to engage the external thread 332 of the second housing 3 of the strain sensor 1 with the internal thread 123 of the mount hole 12.

After the first head 25 of the first housing 2 of the strain sensor 1 contacts the end surface 111 of the cylinder head 11, the rotation of the strain sensor 1 will cause the external thread 332 of the second housing 3 to be turned relative to the internal thread 123 of the mount hole 12 by an angle equivalent to the gap c3, thereby fastening the strain sensor 1 into the mount hole 12. Specifically, the second housing 3 leaves the first housing 2 and linearly advances by the gap c3 toward the front end side Z2 of the mount hole 12.

Since the gap c3 is greater than each of the gaps c1 and c2, the advancement of the second housing 3 toward the front end side Z2 of the mount hole 12 will cause tensile stress will be developed and exerted both on the first housing 2 and the second housing 3. Additionally, the pressure mechanism 4 is compressed by the first face 211 of the first housing 2 and the second face 311 of the second housing 3 by a degree equivalent to a difference in size between the gap c3 and the gaps c1 and c2, thereby firmly retaining the pressure measuring mechanism 4 between the first face 211 of the first housing 2 and the second face 311 of the second housing 3.

The assembling, installation, and an measuring operation of the strain sensor 1 will be described below in detail with reference to FIGS. 5, 7, 8, and 9.

Figure 8:
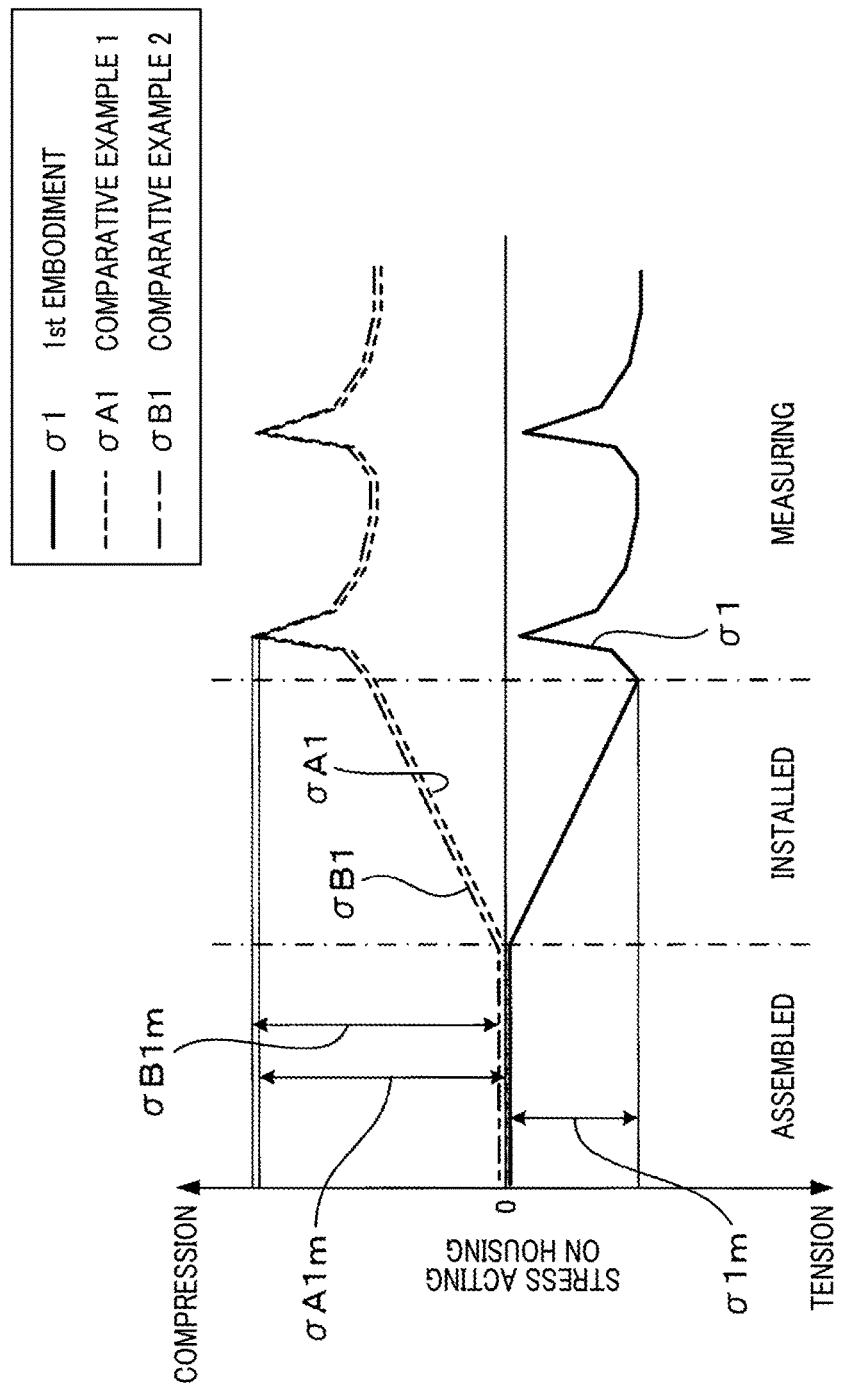
FIG. 8 is a graph which demonstrates changes in stress exerted on a housing of a strain sensor when being assembled, installed, and placed in measuring mode in the first embodiment.
Figure 9:
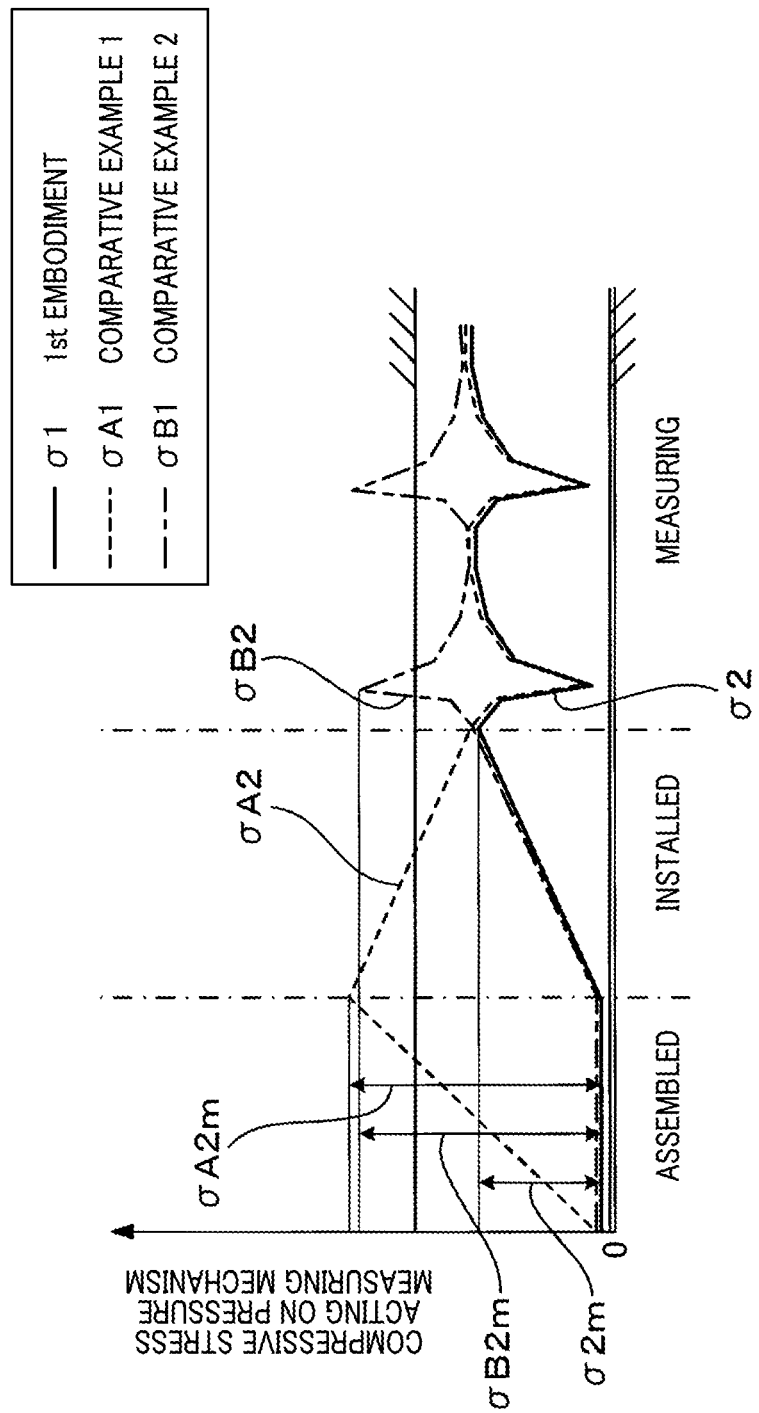
FIG. 9 is a graph which demonstrates changes in compressive stress acting on a pressure measuring mechanism of a strain sensor when being assembled, installed, and placed in measuring mode in the first embodiment.

The stress acting on the housings 2 and 3 and the pressure measuring mechanism 4 of the strain sensor 1 usually changes among the assembling of the strain sensor 1, the installation of the strain sensor 1 in the cylinder head 11, and a measuring operation of the strain sensor 1. FIG. 8 is a graph which demonstrates a change in stress acting on the housings 2 and 3 when the strain sensor 1 is assembled, when the strain sensor 1 is installed in the cylinder head 11, and when the strain sensor 1 is in the measuring operation. In the graph, when the stress is greater than zero, it means that the compressive stress is being exerted on the housings 2 and 3, while when the stress is less than zero, it means that the tensile stress is being exerted on the housings 2 and 3. FIG. 9 is a graph which demonstrates a change in compressive stress acting on the pressure measuring mechanism 4 when the strain sensor 1 is assembled, when the strain sensor 1 is installed in the cylinder head 11, and when the strain sensor 1 is in the measuring operation.

When Strain Sensor is being Assemblied

Figure 5:
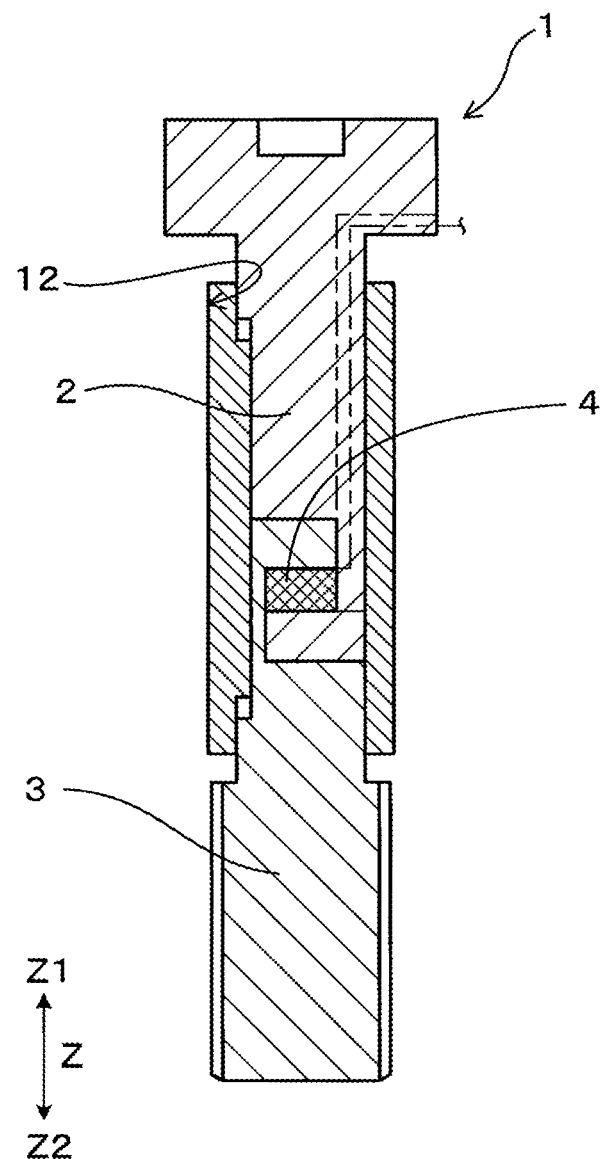
FIG. 5 is a longitudinal sectional view which illustrates an assembling step of a strain sensor in the first embodiment.

When the strain sensor 1 is being assembled, the stress is, as can be seen in FIGS. 5, 8, and 9, not exerted on the pressure measuring mechanism 4 because there are the gaps c1 and c2.

When Strain Sensor is Installed

Figure 6:
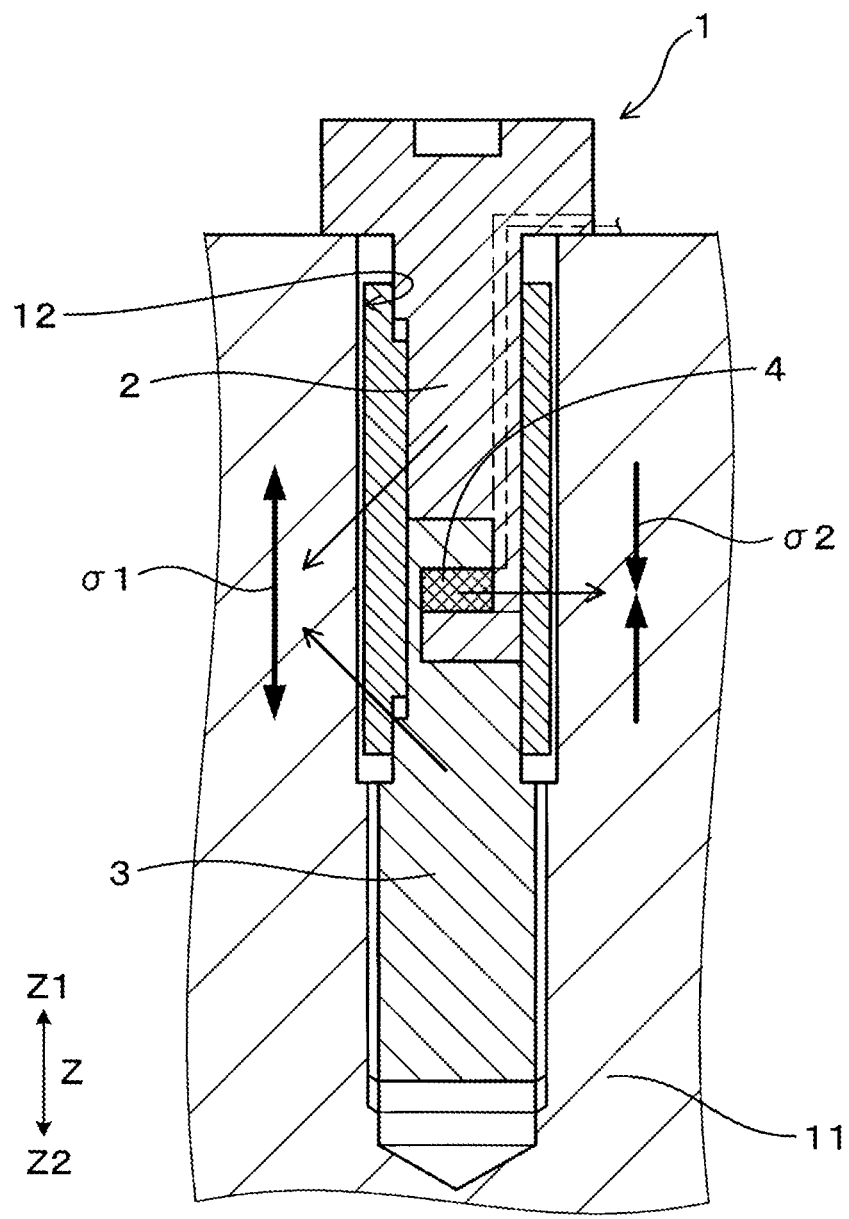
FIG. 6 is a longitudinal sectional view which illustrates an installation step of a strain sensor in the first embodiment.

When the strain sensor 1 is installed in the mount hole 12 of the cylinder head 11, that is, when the strain sensor 1 is fastened into the mount hole 12, the second housing 3, as described above, leaves the first housing 2 and moves toward the front end side Z2 of the mount hole 12, thereby causing the tensile stress $\sigma 1$, as can be seen in FIGS. 6, 8, and 9, to be exerted on the first housing 2 and the second housing 3, so that the compressive stress $\sigma 2$ acts on the pressure measuring mechanism 4.

The exertion of stress on the strain sensor 1 when being installed in the cylinder head 11 will be described below in more detail.

When the strain sensor 1 is installed in the cylinder head 11, the strain sensor 1 is, as illustrated in FIG. 6, turned into the mount hole 12. After the first head 25 of the first housing 2 reaches the end surface 111 of the cylinder head 11, the turning of the strain sensor 1 will cause the second housing 3 to be rotated so that it advances toward the bottom of the mount hole 12 (i.e., the base end side Z1 of the mount hole 12 until the thread ridge surface 333A of the external thread 332 of the second housing 3 which, as can be seen in FIG. 4, faces the bottom (i.e., the base end side Z1) of the mount hole 12 contacts the thread ridge surface 124A of the internal thread 123 of the mount hole 12.

The advancement of the second housing 3 in the mount hole 12 will cause the second housing 3 to leave the first housing 2, so that the tensile stress $\sigma 1$, as demonstrated in FIGS. 6 and 8, is exerted on the first housing 2 and the second housing 3, thereby firmly holding the pressure measuring mechanism 4 between the first face 211 of the first housing 2 and the second face 311 of the second housing 3. The development of the tensile strass $\sigma 1$ results in exertion of the compressive stress $\sigma 2$, as illustrated in FIG. 9, on the pressure measuring mechanism 4. In this way, the installation of the strain sensor 1 in the cylinder head 11 will create, as can be seen in FIG. 6, the tensile stress $\sigma 1$ exerted on the first housing 2 and the second housing 3 and the compressive stress $\sigma 2$ exerted on the pressure measuring mechanism 4 as the precompression.

When Strain Sensor is in Measuring Operation

Figure 7:
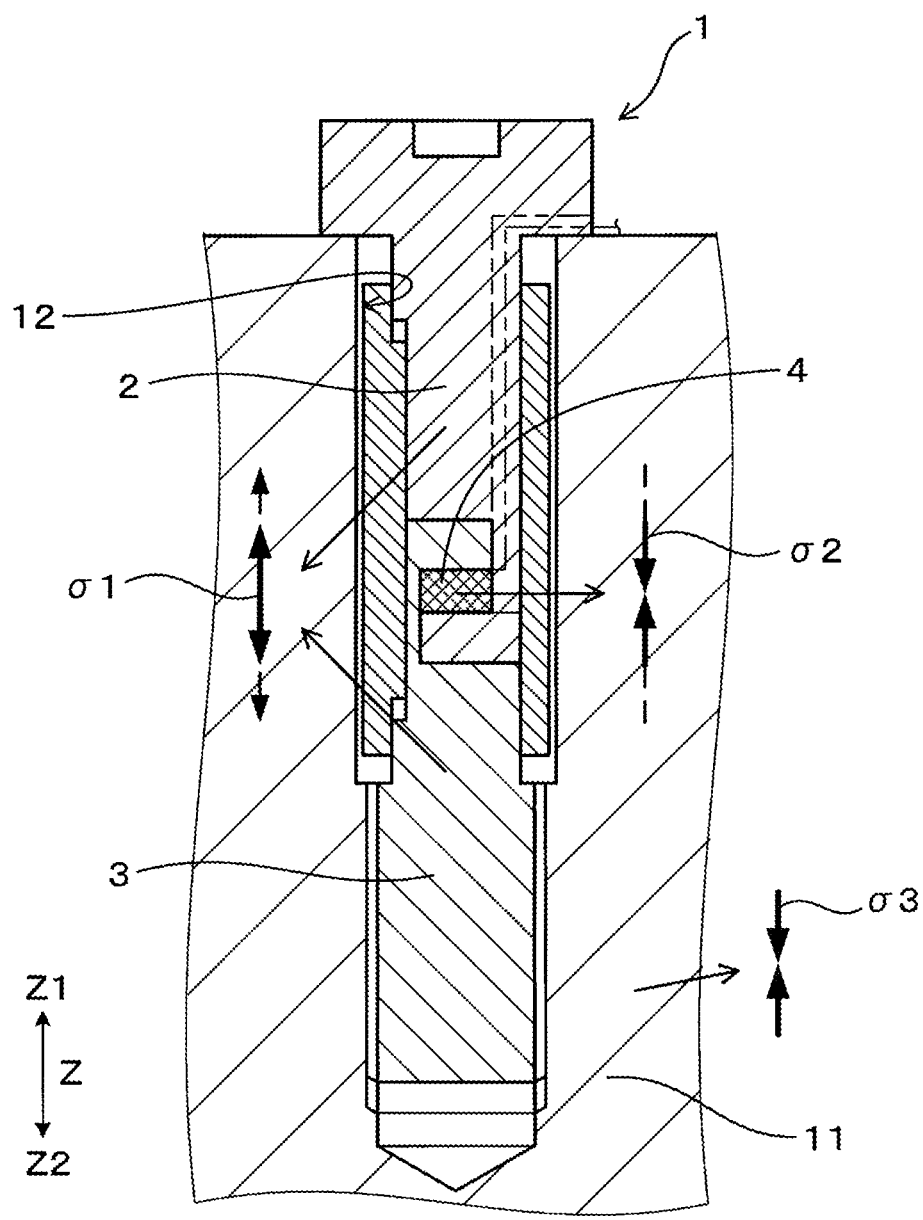
FIG. 7 is a longitudinal sectional view which illustrates a strain sensor in the first embodiment when measuring strain.

When the strain sensor 1 is placed in the measuring operation to measure the combustion pressure in the combustion chamber 14 of the internal combustion engine 10, the cylinder 11, as can be seen in FIGS. 7, 8, and 9, is subjected to the compression stress $\sigma 3$ which results from the combustion pressure. This causes stress to be created to compress the first housing 2 and the second housing 3, so that the degree of tensile stress $\sigma 1$ which has acted on the first housing 2 and the second housing 3 upon the installation of the strain sensor 1 is decreased. Additionally, tensile stress also acts on the pressure measuring mechanism 4, so that the compressive stress $\sigma 2$ which has acted on the pressure measuring mechanism 4 upon the installation of the strain sensor 1 is decreased.

The stress acting on the strain sensor 1 in the measuring operation will also be described in more detail.

When the strain sensor 1 is in the measuring operation and when the cylinder head 11 is compressed, it will cause the second housing 3 which threadedly engages the cylinder head 11 to be urged toward the first housing 2, thereby creating compressive stress acting on the first housing 2 and the second housing 3. This partially releases the tensile stress σ1 which has already acted on the first housing 2 and the second housing 3 after the strain sensor 1 is installed in the cylinder head 11.

The absolute value σ1m of the stress acting on the first housing 2 and the second housing 3, therefore, becomes substantially equal to the absolute value of the tensile stress σ1 created upon the installation of the strain sensor 1, that is, will be small. This results in a decrease in required degree of mechanical strength of the first housing 2 and the second housing 3, thereby enhancing the reliability of the strength of the first housing 2 and the second housing 3. This enables the size of the first housing 2 and the second housing 3 to be decreased to decrease the overall size of the strain sensor 1. In the graphs of FIGS. 8 and 9, two peaks indicate the event of combustion of fuel in the internal combustion engine 10.

When the compressive stress is being exerted on the first housing 2 and the second housing 3 in the measuring operation of the strain sensor 1, the tensile stress will be exerted on the pressure measuring mechanism 4 retained by the first face 211 and the second face 311, thereby partially releasing the compressive stress σ2 which has been exerted on the pressure measuring mechanism 4 upon installation of the strain sensor 1 in the cylinder head 11.

The absolute value σ2m of the stress acting on the pressure measuring mechanism 4, therefore, becomes substantially equal to the absolute value of the compressive stress σ2 created upon the installation of the strain sensor 1, that is, will be small. This results in a decrease in required degree of mechanical strength of the pressure measuring mechanism 4, thereby enhancing the reliability of the strength of the pressure measuring mechanism 4. A variation in stress acting on the pressure measuring mechanism 4 is also decreased, thereby enabling a required range in which the pressure measuring mechanism 4 measures the combustion pressure to be decreased, thereby enlarging the range of selection of the type of the pressure measuring mechanism 4.

As apparent from the above discussion, the structure of the strain sensor 1 has the improved reliability of mechanical strength of the housings 2 and 3 and the pressure measuring mechanism 4 and the wide range of selection of the type of the pressure measuring mechanism 4.

Beneficial advantages of the strain sensor 1 will also be described below in comparison with two conventional types of strain sensors 9A and 9B.

Comparative Example 1

Figure 17:
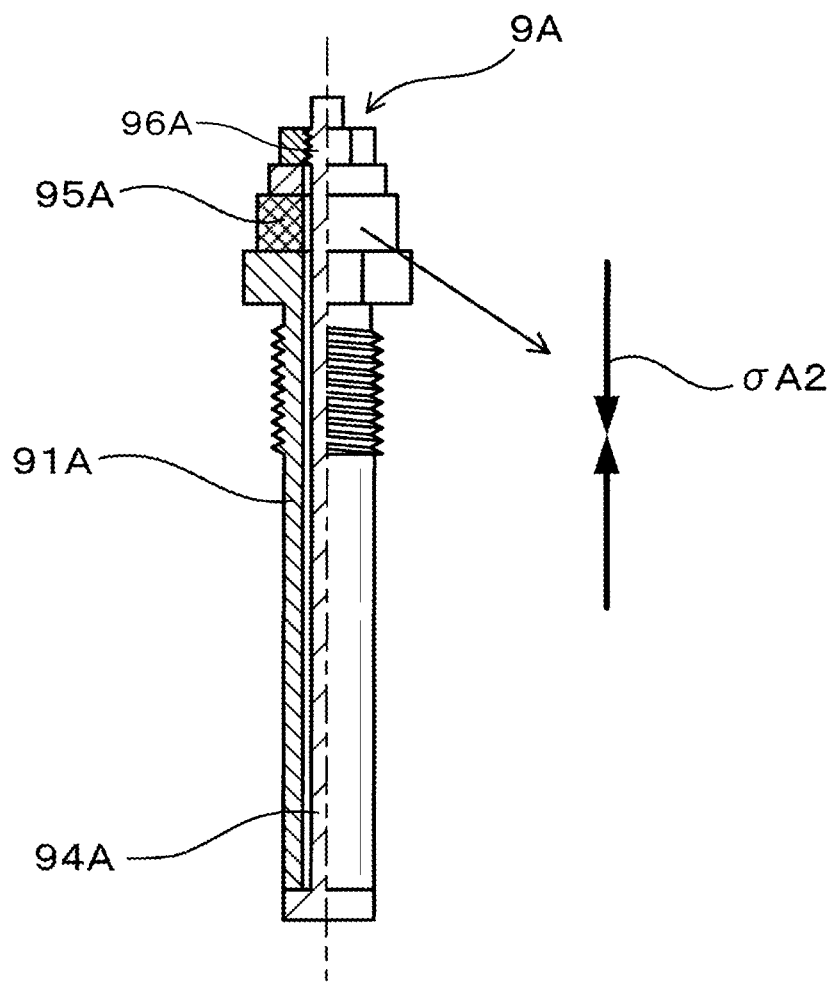
FIG. 17 is a partially longitudinal sectional view which illustrates a comparative example 1 of a strain sensor when being assembled.
Figure 18:
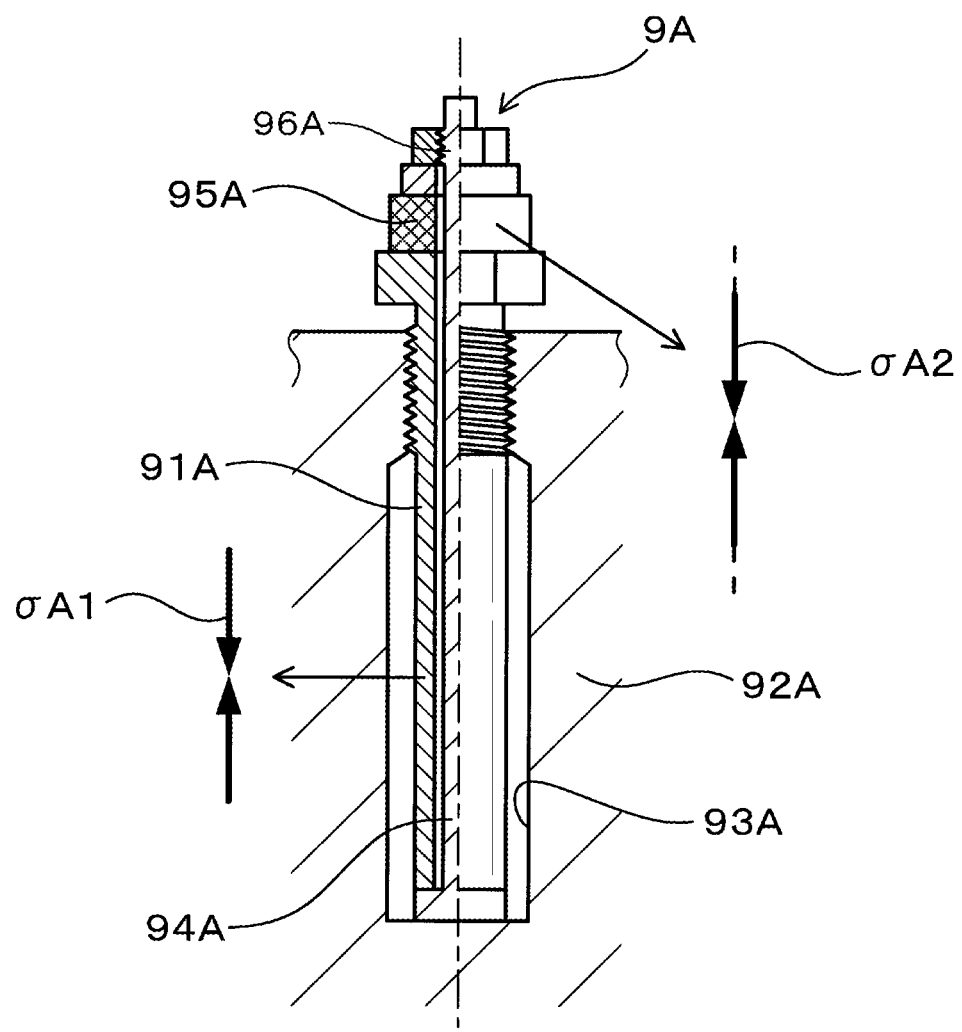
FIG. 18 is a partially longitudinal sectional view which illustrates a comparative example 1 of a strain sensor during installation in a measuring target.
Figure 19:
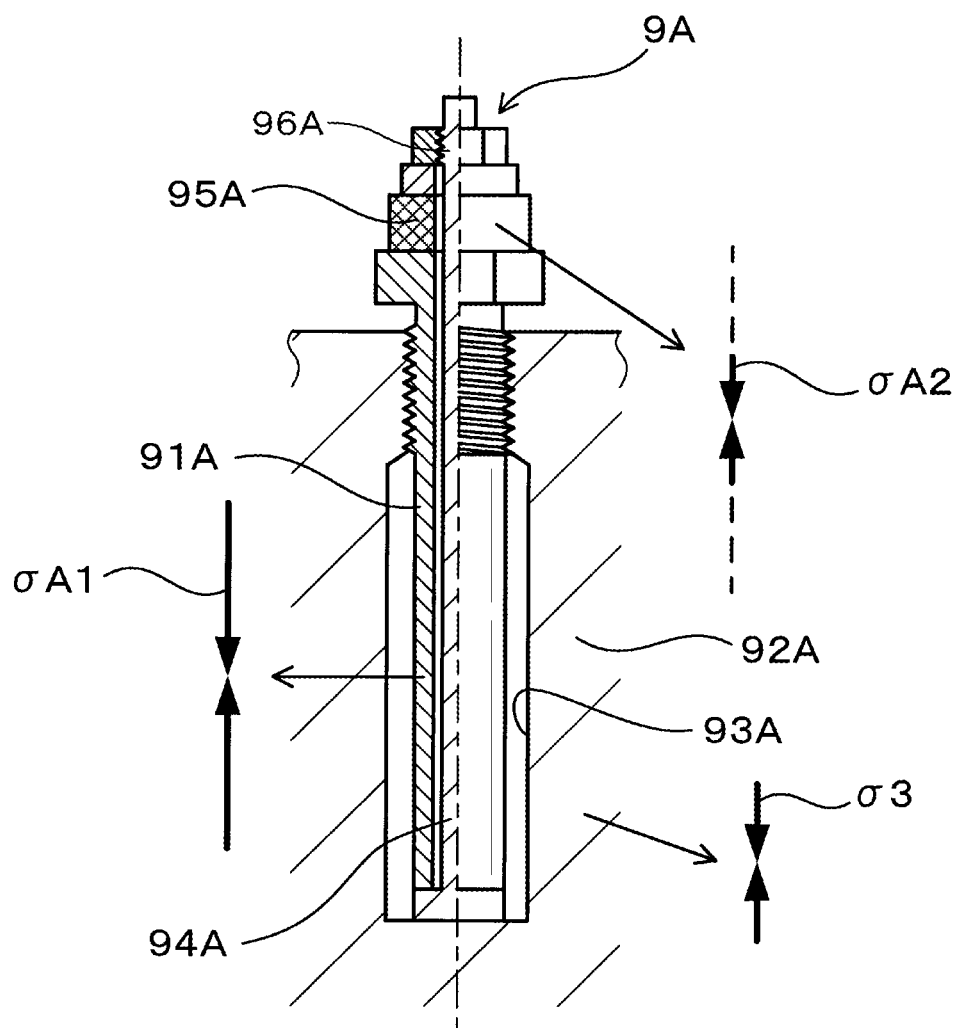
FIG. 19 is a partially longitudinal sectional view which illustrates a comparative example 1 of a strain sensor when being placed in a measuring mode.

FIGS. 17, 18, and 19 illustrate the strain sensor 9A in the comparative example 1. The strain sensor 9A is designed to measure the combustion chamber using the fact that a change in stress on the center shaft 94A disposed in the housing 91A will become greater than that on the housing 91A threadedly engaging the mount hole 93A formed in the cylinder head 92A when the fuel is fired in the internal combustion engine. The pressure measuring mechanism 95A is disposed between the nut 96A fastened to the base end of the center shaft 94A and the base end surface of the housing 91A.

FIG. 8 also demonstrates a change in stress acting on the housing 91A of the strain sensor 9A when the strain sensor 9A is assembled, when the strain sensor 9A is installed in the cylinder head 92A, and when the strain sensor 9A is in the measuring operation. FIG. 9 also represents a change in stress acting on the pressure measuring mechanism 95A when the strain sensor 9A is assembled, when the strain sensor 9A is installed in the cylinder head 92A, and when the strain sensor 9A is in the measuring operation.

When Strain Sensor is Assemblied

When the strain sensor 9A is assembled, the front end of the center shaft 94A does not contact the bottom of the mount hole 93A, so that fore tightening the nut 96A is absorbed as pressure compressing the pressure measuring mechanism 95A, thus causing stress to hardly act on the housing 91A. The pressure measuring mechanism 95A is firmly retained between the housing 91A and the nut 96A fastened to the center shaft 94A, so that the compressive stress σA2, as illustrated in FIGS. 8, 9, and 17, is exerted on the pressure measuring mechanism 95A as precompression.

When Strain Sensor is Installed

When the strain sensor 9A is installed in the mount hole 93A of the cylinder head 92A, that is, when housing 91A is screwed into the mount hole 93A. After the front end of the center shaft 94A contacts the bottom of the mount hole 93A, the force tightening the nut 96A is exerted on the housing 91A through the center shaft 94A, so that the compressive stress σA1, as illustrated in FIGS. 8, 9, and 18, is exerted on the housing 91A as precompression.

The exertion of the compressive stress σA1 on the housing 91A will cause the nut 96A fastened to the center shaft 94A to be urged away from the pressure measuring mechanism 95A, so that stress is developed to pull the pressure measuring mechanism 95A, thereby partially releasing the compressive stress σA2 which is exerted on the pressure measuring mechanism 95 upon installation of the strain sensor 9A in the cylinder head 92A.

When Strain Sensor is in Measuring Operation

When the strain sensor 9A is placed in the measuring operation to measure the combustion pressure in the internal combustion engine, and when the compressive stress σ3 which results from the combustion or fuel in the internal combustion engine is exerted on the cylinder head 92A, the compressive stress σA1 added to the housing 91A, as can be seen in FIG. 19, will be the sum of the compressive stress exerted as the precompression upon the installation of the strain sensor 9A in the cylinder head 92A and the compressive stress developed by the combustion of fuel in the internal combustion engine.

Accordingly, the absolute value σA1m of the stress acting on the housing 91A, illustrated in FIG. 8, becomes equal to the sum of the compressive stress, as created upon the installation of the strain sensor 9A, and the compressive stress, as created by the combustion of fuel in the internal combustion engine. The absolute value σA1m is, thus, greater than the absolute value σ1m of the stress acting on the strain sensor 1 of the first embodiment when it is measuring the combustion pressure in the internal combustion engine 10. The strain sensor 9A in the comparative example 1 is, therefore, required to have an increased mechanical strength of the housing 91A, which may lead to a lack of reliability of the mechanical strength of the housing 91A.

When the strain sensor 9A is in the measuring operation, and the compressive stress σ3, as developed by the combustion pressure, is exerted on the cylinder head 92A, as demonstrated in FIG. 19, it increases the compressive stress σA1 acting on the housing 91A, so that the nut 96A threadedly engaging the center shaft 94A is further urged away from the pressure measuring mechanism 95A. This causes stress to be created to pull the pressure measuring mechanism 95A, thereby partially releasing the compressive stress σA1 exerted on the pressure measuring mechanism 95A upon the installation of the strain sensor 9A.

The measurement of the combustion pressure made by the pressure measuring mechanism 95A of the strain sensor 9A is, as illustrated in FIG. 9, accomplished with a decrease in compressive stress σA2 exerted on the pressure measuring mechanism 95A. It is, thus, necessary to determine the degree of the compressive stress σA2 which is needed to be applied to the pressure measuring mechanism 95A upon the assembling of the strain sensor 9A in light of an amount by which the compressive stress σA2 will be decreased when the strain sensor 9A is installed in the internal combustion engine or subjected to the combustion pressure when the strain sensor 9A is in the measuring operation. This results in need for increasing the absolute value σA2m of stress added to the pressure measuring mechanism 95A, thus needing the required mechanical strength of the pressure measuring mechanism 95A of the strain sensor 9A in the comparative example 1 to be increased. This may lead to a lack of reliability of the mechanical strength of the pressure measuring mechanism 95A.

Comparative Example 2

Figure 20:
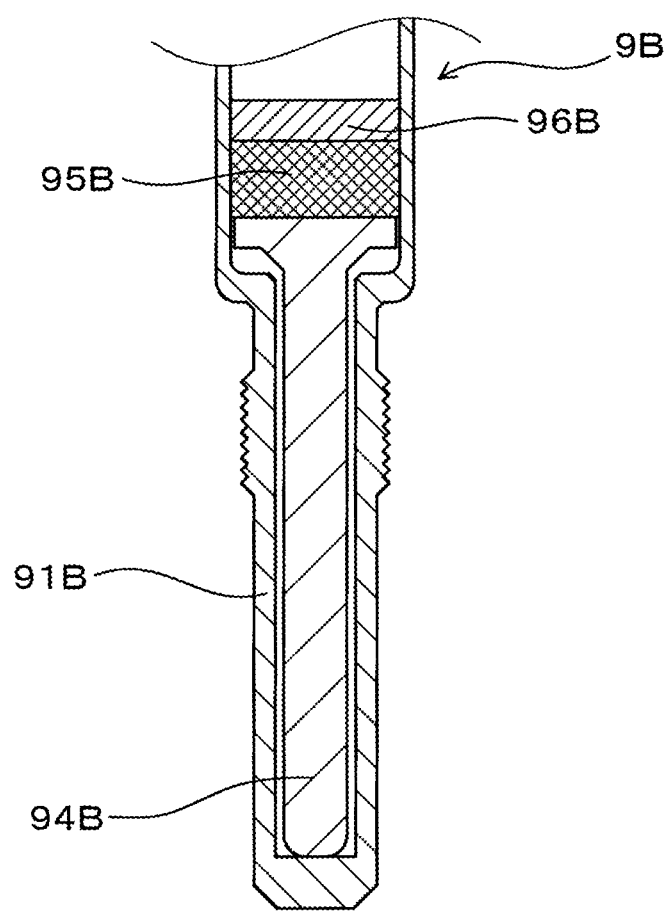
FIG. 20 is a partially longitudinal sectional view which illustrates a comparative example 2 of a strain sensor during assembling thereof.
Figure 21:
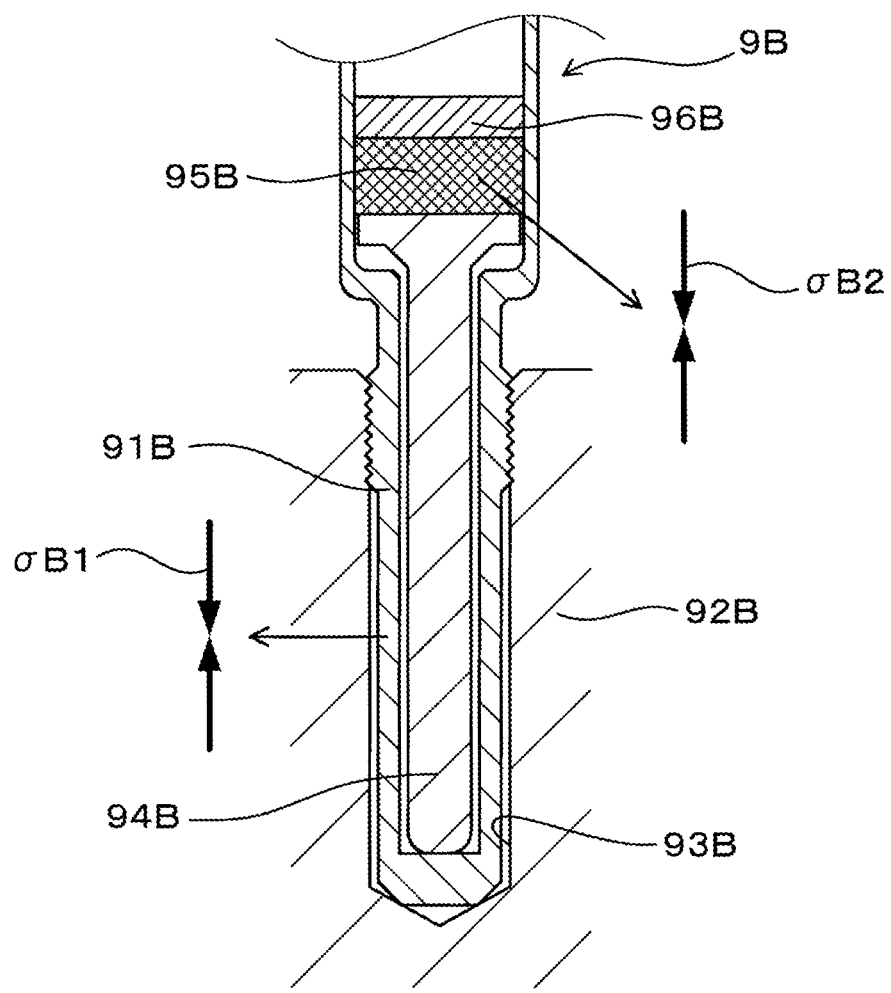
FIG. 21 is a partially longitudinal sectional view which illustrates a comparative example 2 of a strain sensor during installation in a measuring target.
Figure 22:
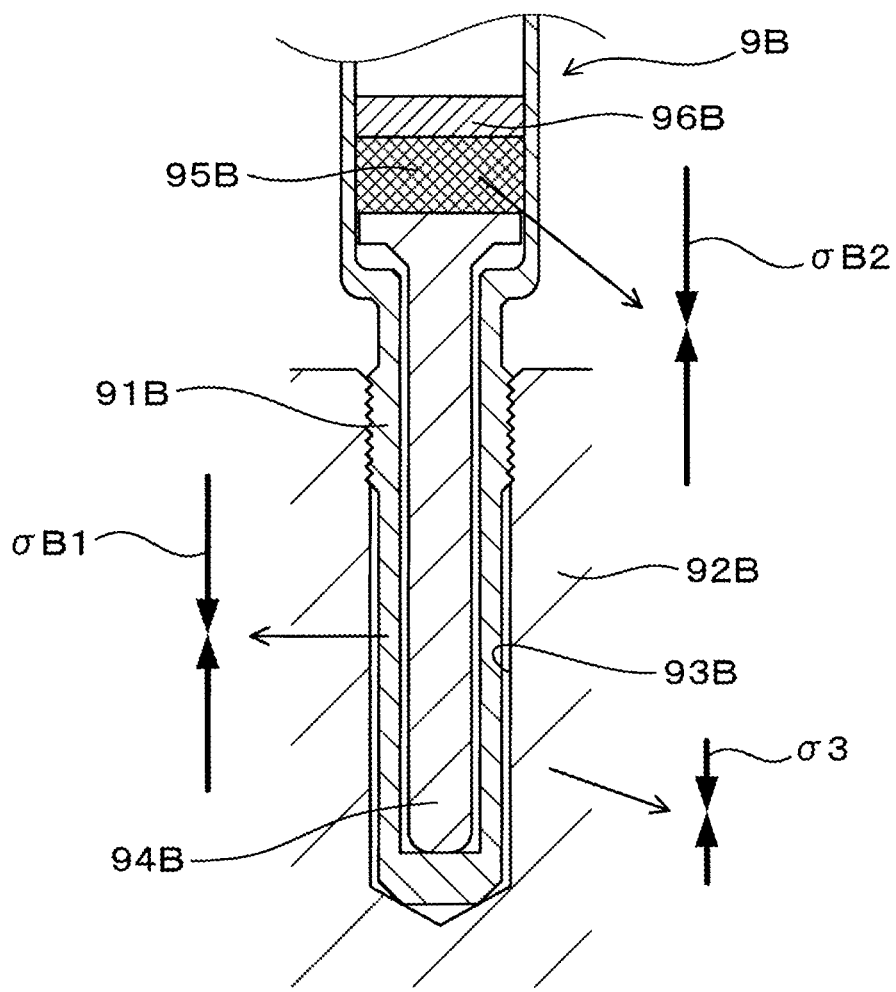
FIG. 22 is a partially longitudinal sectional view which illustrates a comparative example 2 of a strain sensor when being placed in a measuring mode.

FIGS. 20, 21, 22 illustrate the strain sensor 9B in the comparative example 2. The strain sensor 9B is designed to measure the combustion chamber using the fact that a change in stress on the center shaft 94B disposed in the housing 91B will become greater than that of the housing 91B threadedly engaging the mount hole 93B formed in the cylinder head 92B when the fuel is fired in the internal combustion engine. The pressure measuring mechanism 95B is disposed between the fastener 96B disposed on the base end of the housing 91B and the base end of the center shaft 94B.

FIG. 8 also demonstrates a change in stress acting on the housing 91B when the strain sensor 9B is assembled, when the strain sensor 9B is installed in the cylinder head of the internal combustion engine, and when the strain sensor 9B is in the measuring operation. FIG. 9 also represents a change in stress acting on the pressure measuring mechanism 95B when the strain sensor 9B is assembled, when the strain sensor 9B is installed in the cylinder head, and when the strain sensor 9B is in the measuring operation.

When Strain Sensor is Assemblied

In assembling of the strain sensor 9B, the pressure measuring mechanism 95B is fixed without being compressed by the fastener 96B of the housing 91B, so that stress is, as can be seen in FIGS. 8, 9, and 20, hardly exerted on the housing 91B. The fastener 96B is retained or located in the housing 91B without pressing the pressure measuring mechanism 95B, so that stress is hardly exerted on the pressure measuring mechanism 95B.

When Strain Sensor is Installed

When the strain sensor 9B is, as illustrated in FIG. 21, installed in the cylinder head 92B, the housing 91B is threadedly fastened into the mount hole 93B of the cylinder head 92B until the front end of the housing 91B contacts the bottom of the mount hole 93B, thereby compressing the housing 91B, so that the compressive stress σB1 is, as demonstrated in FIG. 8, exerted on the housing 91B. The exertion of the compressive stress σB1 on the housing 91B results in exertion of stress on the center shaft 94B, thereby firmly compressing the pressure measuring mechanism 95B between the center shaft 94B and the fastener 96B, so that the compressive stress σB2 is, as demonstrated in FIG. 9, applied to the pressure measuring mechanism 95B.

When Strain Sensor is in Measuring Operation

When the strain sensor 9B is placed in the measuring operation to measure the combustion pressure in the internal combustion engine, and when the compressive stress σ3 which results from the combustion or fuel in the internal combustion engine is exerted on the cylinder head 92B, the compressive stress σB1 added to the housing 91B, as can be seen in FIG. 22, will be the sum of the compressive stress exerted as the precompression upon the installation of the strain sensor 9B in the cylinder head 92B and the compressive stress developed by the combustion of fuel in the internal combustion engine.

Accordingly, the absolute value σB1m of the stress acting on the housing 91B, illustrated in FIG. 8, becomes equal to the sum of the compressive stress, as created upon the installation of the strain sensor 9B, and the compressive stress, as created by the combustion of fuel in the internal combustion engine. The absolute value σB1m is, thus, greater than the absolute value σ1m of the stress acting on the strain sensor 1 of the first embodiment when it is measuring the combustion pressure in the internal combustion engine 10. The strain sensor 9B in the comparative example 2 is, therefore, required to have an increased mechanical strength of the housing 91B, which may lead to a lack of reliability of the mechanical strength of the housing 91B.

When the strain sensor 9B is in the measuring operation, and the compressive stress σ3, as developed by the combustion pressure, is exerted on the cylinder head 92B, as demonstrated in FIG. 22, the compressive stress σB2 exerted on the pressure measuring mechanism 95B will be the sum of the compressive stress exerted as the precompression upon the installation of the strain sensor 9B in the cylinder head 92B and the compressive stress developed by the combustion of fuel in the internal combustion engine.

The measurement of the combustion pressure made by the pressure measuring mechanism 95B of the strain sensor 9B is, as illustrated in FIG. 9, accomplished with an increase in compressive stress σB2 exerted on the pressure measuring mechanism 95B. The absolute value σB2m applied to the pressure measuring mechanism 95B is, therefore, increased by an increase in compressive stress σB2. This results in an increase in required degree of mechanical strength of the pressure measuring mechanism 95B of the strain sensor 9B in the comparative example 1, which may lead to a lack of reliability of the mechanical strength of the pressure measuring mechanism 95B.

As apparent from the above discussion about the comparative examples 1 and 2, the absolute value σ1m of stress acting on the housings 2 and 3 of the strain sensor 1 of the first embodiment and the absolute value σ2m of stress acting on the pressure measuring mechanism 4 of the strain sensor 1 are, as can be seen in FIGS. 8 and 9, smaller than the absolute values σA1m and σB1m of stress applied to the housings 91A and 91B of the strain sensors 9A and 9B in the comparative examples 1 and 2 and the absolute values σA2m and σB2m of stress applied to the pressure measuring mechanisms 95A and 95B, respectively.

As apparent from the above discussion, the housings 91A and 91B of the strain sensors 9A and 9B in the comparative examples 1 and 2 are subjected to stress only in the same direction upon the installation and the measuring operation of the strain sensors 9A and 9B. This will result in increases in absolute value σA1m and σB1m of the stress acting on the housing 91A and 91B.

Similarly, the pressure measuring mechanisms 95A and 95B of the strain sensors 9A and 9B in the comparative examples 1 and 2 are subjected to stress only in the same direction upon the installation and the measuring operation of the strain sensors 9A and 9B. This will result in increases in absolute value σA2m and σB2m of the stress acting on the pressure measuring mechanism 95A and 95B.

The reasons why the stress is exerted on the housing 91A and 91B in the same direction upon the installation and the measuring operation of the strain sensors 9A and 9B are that each of the housings 91A and 91B is not made up of two discrete parts, and there is no contrivance for firmly retaining the pressure measuring mechanisms 95A and 95B through the housing 91A and 91B.

In contrast, the strain sensor 1 of this embodiment is designed to have two discrete housing parts: the first housing 2 and the second housing 3 which are joined together to form the sensor housing. The first face 211 of the first housing 2 and the second face 311 of the second housing 3 work as a retainer to firmly hold the pressure measuring mechanism 4. This causes the tensile stress σ1 to be exerted on the first housing 2 and the second housing 3 upon the installation of the strain sensor 1 and the compressive stress which is oriented in a direction opposite that in which the tensile stress σ1 acts to be exerted on the first housing 2 and the second housing 3 when the strain sensor 1 is in the measuring operation. The absolute value σ1m of the stress acting on the housings 2 and 3 will, thus, be a value derived by subtracting the compressive stress from the tensile stress σ1, so that stress which is greater than the tensile stress σ1 acting on the first and second housings 2 and 3 as the precompression upon the installation of the strain sensor 1 is not exerted on each of the first and second housings 2 and 3. The absolute value σ1m of the stress acting on the housings 2 and 3 is, therefore, decreased by managing the degree of the tensile stress σ1 of the stress acting on the housings 2 and 3 upon the installation of the strain sensor 1.

The pressure measuring mechanism 4 undergoes the compressive stress σ2 upon the installation of the strain sensor 1, while it undergoes the tensile stress oriented in a direction opposite the compressive stress σ2 when the strain sensor 1 is in the measuring operation. The absolute value σ2m of the stress acting on the pressure measuring mechanism 4 will, therefore, be a value derived by subtracting the tensile stress from the compressive stress σ2, so that stress which is greater than the compressive stress σ2 acting on the pressure measuring mechanism 4 as the precompression upon the installation of the strain sensor 1 is not exerted on the pressure measuring mechanism 4. The absolute value σ2m of the stress acting on the pressure measuring mechanism 4 is, therefore, decreased by managing the degree of the compressive stress σ2 acting on the pressure measuring mechanism 4 upon the installation of the strain sensor 1.

Second Embodiment

The strain sensor 1 of the second embodiment will be described below which has a modification of the holding mechanism which is made up of the first end portion 21 of the first housing 2 and the second end portion 31 of the second housing 3 and firmly holds the pressure measuring mechanism 4. In the second embodiment, the first extended portion 22 supporting the first end portion 21 and the second extended portion 32 supporting the second end portion 31 are different in structure from those in the first embodiment.

Figure 10:
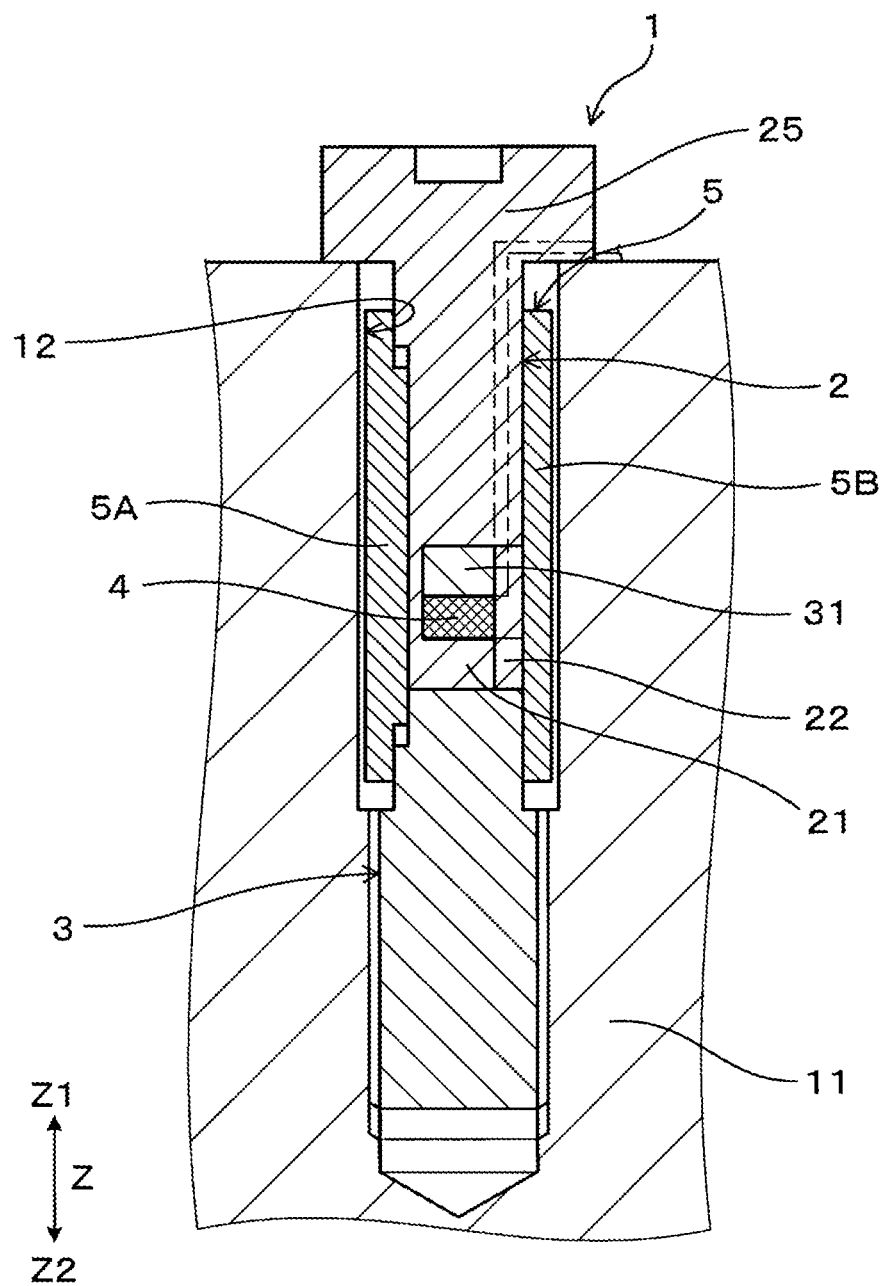
FIG. 10 is a longitudinal sectional view which illustrates a strain sensor of the second embodiment which is installed in a measuring target such as a cylinder head of an internal combustion engine.
Figure 11:
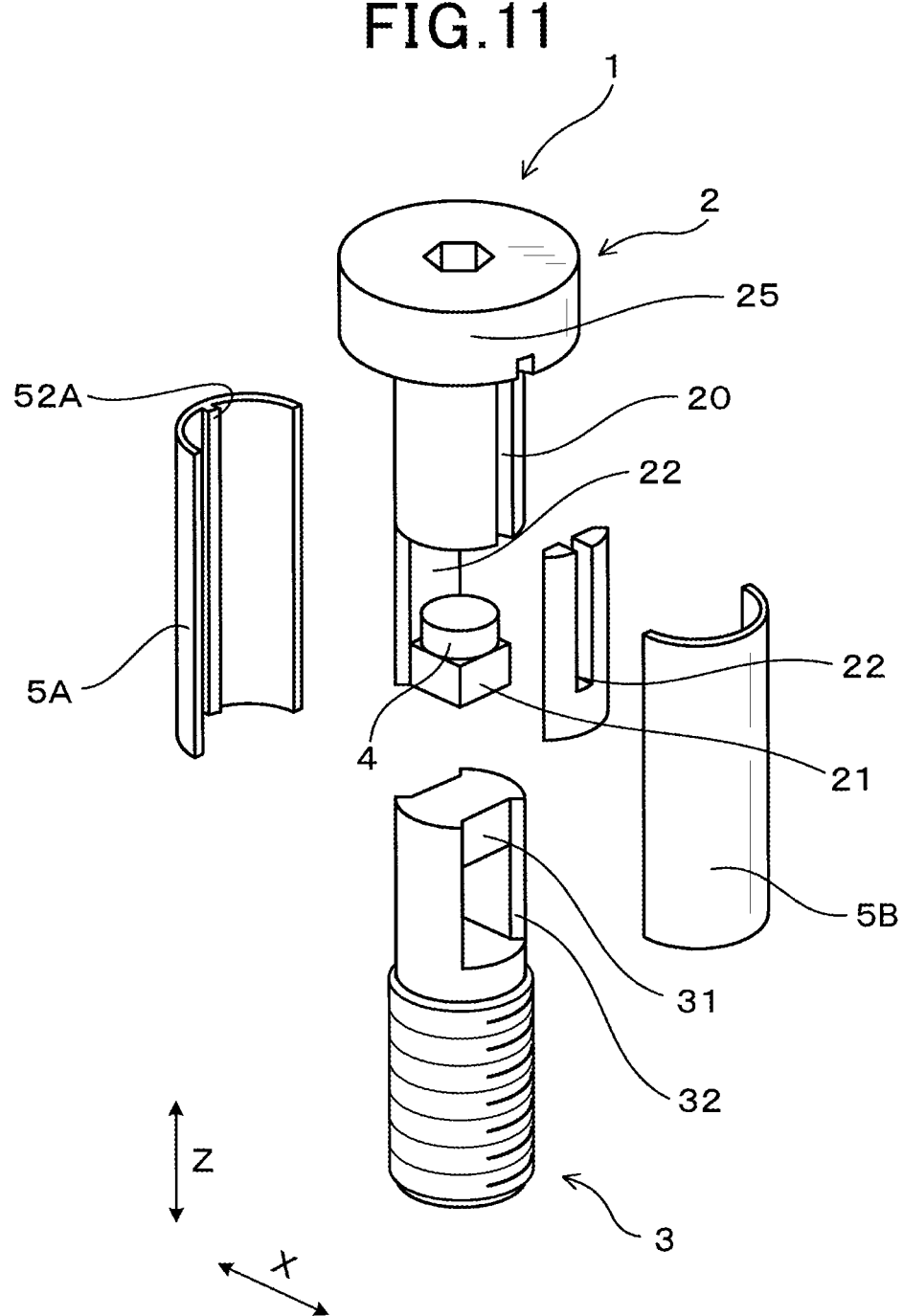
FIG. 11 is a perspective development view which illustrates an entire structure of a strain sensor of the second embodiment.

Referring to FIGS. 10 and 11, the front end side Z2 of the first housing 2 has two first extended portions 22 which face each other in the lateral direction X perpendicular to the axial direction Z of the strain sensor 1. The first end portion 21 is retained at two opposed sides thereof by ends of the first extended portion 22 in the form of a double fixed beam. The first housing 2 may alternatively be designed to have three or more extended portions 22. The base end side Z1 of the second housing 3 has two extended portions 32 which face each other in the lateral direction X and extend in misalignment with the first extended portions 22 in the axial direction Z of the strain sensor 1. The second end portion 31 is retained at two opposed sides thereof by the second extended portions 32 in the form of a double fixed beam. The second housing 3 may alternatively be designed to have three or more extended portions 32.

One of the first extended portions 22 is a discrete member separate from the major body of the first housing 2 which will also be referred to as a first discrete extended portion 22 below. The first discrete extended portion 22 is joined or welded to the first housing 2 after the pressure measuring mechanism 4 is placed between the first end portion 21 and the second end portion 31.

Other arrangements are identical with those in the first embodiment, and explanation thereof in detail will be omitted here. In embodiments following the second embodiment, the same reference numbers as employed in the first embodiment will refer to the same parts unless otherwise specified.

The strain sensor 1 of this embodiment is designed to apply pressure uniformly to the surface of the pressure measuring mechanism 4 in the lateral direction X after the pressure measuring mechanism 4 is firmly held between the first end portion 21 and the second end portion 31 as compared with the first embodiment. This eliminates a risk that the pressure is locally applied to the pressure measuring mechanism 4 in the lateral direction X.

The structure of the strain sensor 1 of this embodiment also offers the same advantages as in the first embodiment.

Third Embodiment

The strain sensor 1 of the third embodiment will be described below which has a modification of the holding mechanism which is made up of the first end portion 21 of the first housing 2 and the second end portion 31 of the second housing 3 and firmly holds the pressure measuring mechanism 4. The strain sensor 1 of the third embodiment is designed to have the second housing 3 made up of two discrete members and firmly hold the pressure measuring mechanism 4 between the first end portion 21 of the first housing 2 and the second end portion 31 of the second housing 3 when the second housing 3 is assembled with the discrete members.

Figure 12:
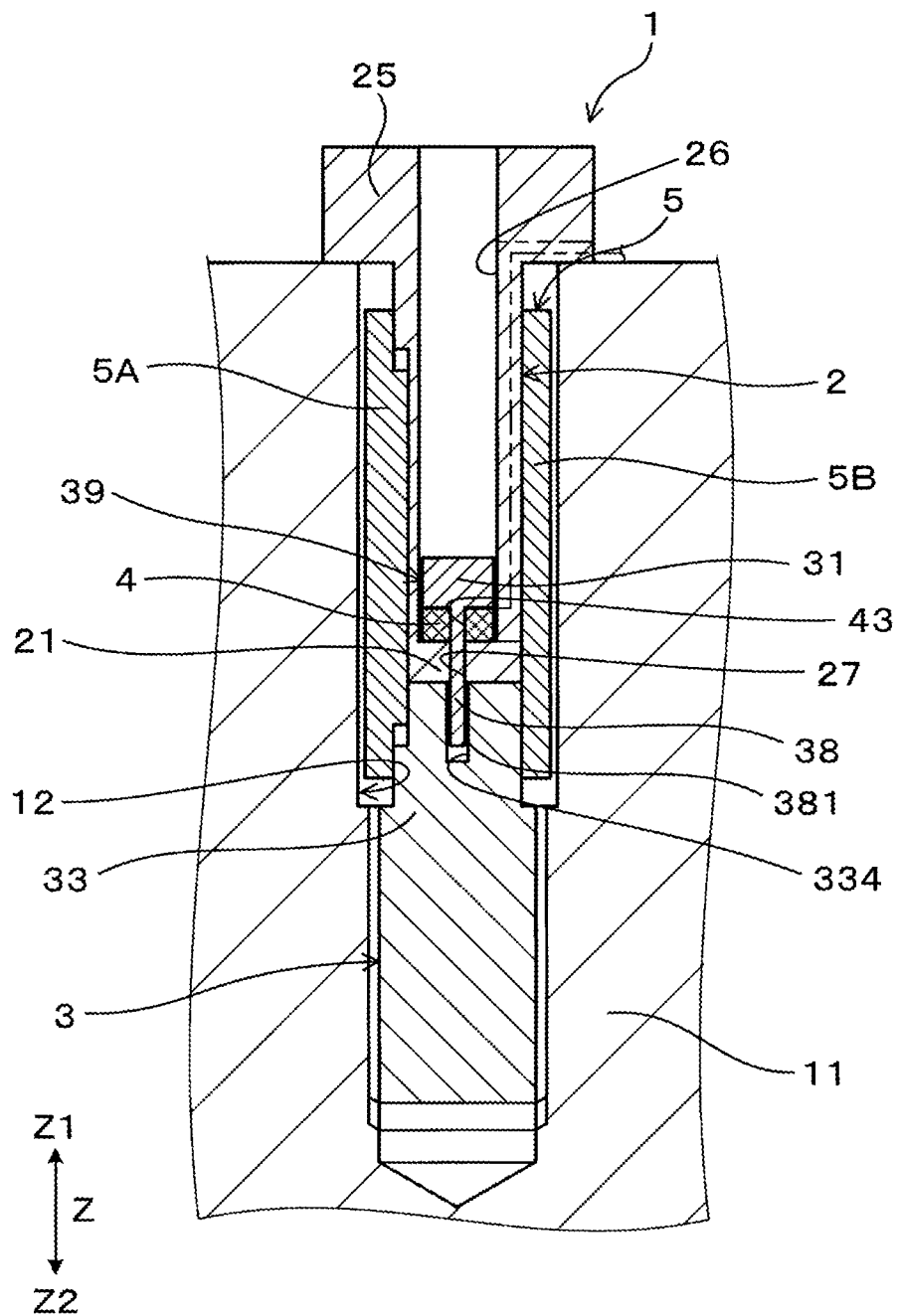
FIG. 12 is a longitudinal sectional view which illustrates a strain sensor of the third embodiment which is installed in a measuring target such as a cylinder head of an internal combustion engine.
Figure 13:
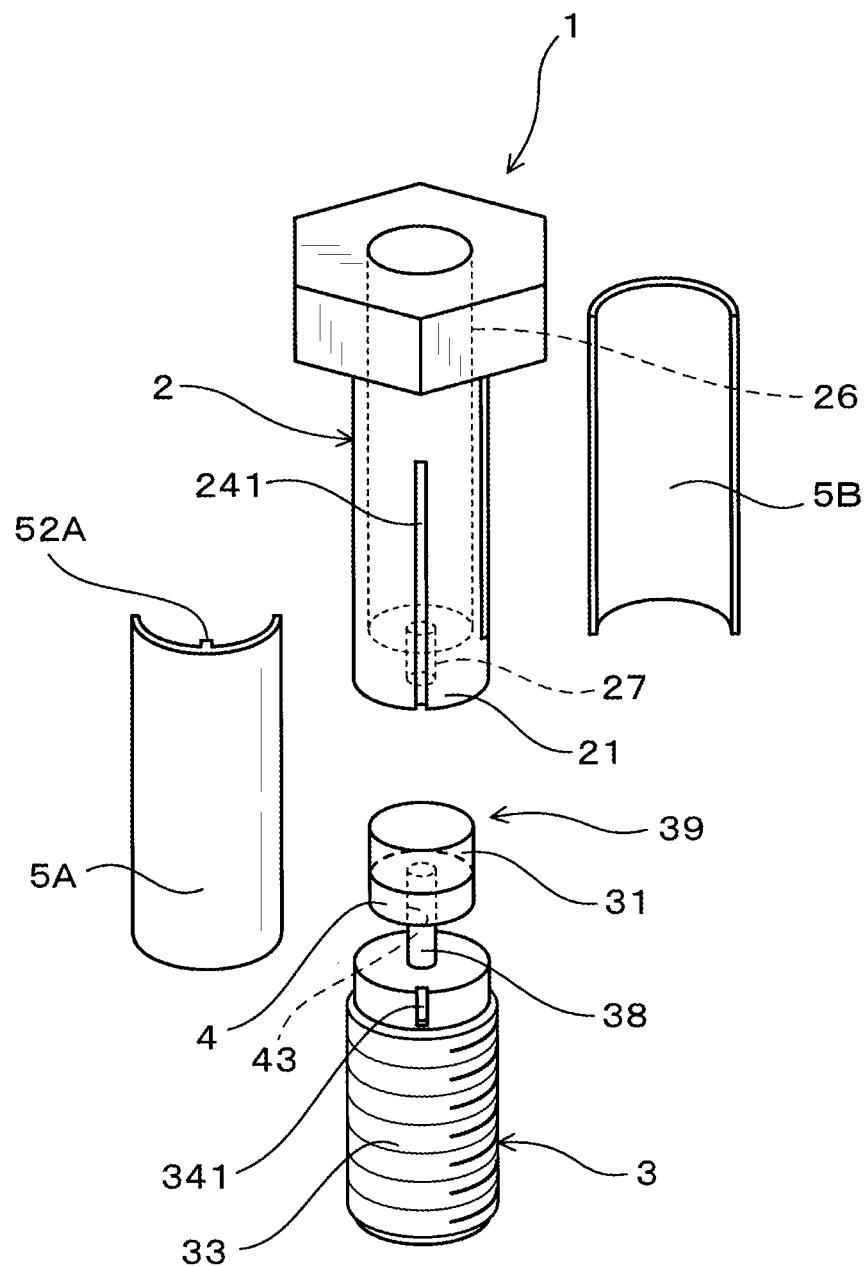
FIG. 13 is a perspective development view which illustrates an entire structure of a strain sensor of the third embodiment.

The first end portion 21 in this embodiment is, as illustrated in FIGS. 12 and 13, defined by a bottom of the center hole 26 formed in the first housing 2. The bottom is located on the front end side Z2 of the center hole 26. The first end portion 21 has formed therein the through-hole 27 extending through the thickness thereof. The hole 27 is smaller in diameter than the center hole 26. The second end portion 31 is located on the base end side Z1 of the second extended portion 38 inserted into the hole 27 formed on the base end side Z1 of the second housing 3. The second end portion 31 is of a cylindrical shape which has an outer diameter greater than that of the second extended portion 38 formed in the shape of a bar. The second end portion 31 is disposed in the center hole 26.

The second housing 3 includes the second end portion 31 and the second extended portion 38. A combination of the second end portion 31 and the second extended portion 38 serves as a fastener 39 which is a discrete part separate from the second body 33. The pressure measuring mechanism 4 is arranged inside the center hole 26. The second end portion 31 of the fastener 39 is located on the base end side Z1 of the pressure measuring mechanism 4 within the center hole 26. The second extended portion 38 of the fastener 39 is joined or fastened to the second body 33 through the hole 27 of the first end portion 21.

In the fastener 39, the second extended portion 38 is made of a cylindrical bar extending from the center of an end surface of the second end portion 31. The pressure measuring mechanism 4 is of an annular shape with the center hole 43. The second extended portion 38 of the fastener 39 is inserted into the center hole 43 of the pressure measuring mechanism 4. The second extended portion 38 has the external thread 381 formed on a front end thereof. The second body 33 of the second housing 3 has the internal thread 334 formed in the base end side Z1 of the second body 33. The internal thread 334 engages the external thread 381 to firmly retain the pressure measuring mechanism 4 between the first end portion 21 and the second end portion 31.

The installation of the strain sensor 1 in the cylinder head 11 is achieved by inserting the second extended portion 38 of the fastener 39 into the center hole 43 of the pressure measuring mechanism 4, arranging such an assembly of the fastener 39 and the pressure measuring mechanism 4 in the center hole 26 of the first housing 2, inserting the second extended portion 38 into the hole 27 of the first housing 2, and then tightening the external thread 381 of the second extended portion 38 to engage the internal thread 334 of the second body 33, thereby firmly securing the fastener 39 to the second housing 3.

In the above way, the pressure measuring mechanism 4 is firmly retained or nipped between the first end portion 21 of the first housing 2 and the second end portion 31 of the fastener 39. The strain sensor 1 may be designed to have a positioning mechanism in the second end portion 31 or the second extended portion 38 of the fastener 39 to position the pressure measuring mechanism 4 relative to the second body 33 for avoiding exertion of compressive stress on the pressure measuring mechanism 4 upon the installation of the strain sensor 1.

Other arrangements of the strain sensor 1 are identical with those in the first embodiment.

The strain sensor 1 of the third embodiment is, as described above, designed to have the second housing 3 made up of two discrete members, thereby facilitating the ease with which the first housing 2 and the second housing 3 are produced and also facilitating control of dimensions of the first housing 2 and the second housing 3.

The structure of the strain sensor 1 of this embodiment also offers the same advantages as in the first embodiment.

Fourth Embodiment

The strain sensor 1 of the fourth embodiment will be described below which has a modification of the holding mechanism which is made up of the first end portion 21 of the first housing 2 and the second end portion 31 of the second housing 3 and firmly holds the pressure measuring mechanism 4. The strain sensor 1 of the fourth embodiment is designed to have the first housing 2 made up of two discrete members and firmly hold the pressure measuring mechanism 4 between the first end portion 21 of the first housing 2 and the second end portion 31 of the second housing 3 when the first housing 2 is assembled with the discrete members.

Figure 14:
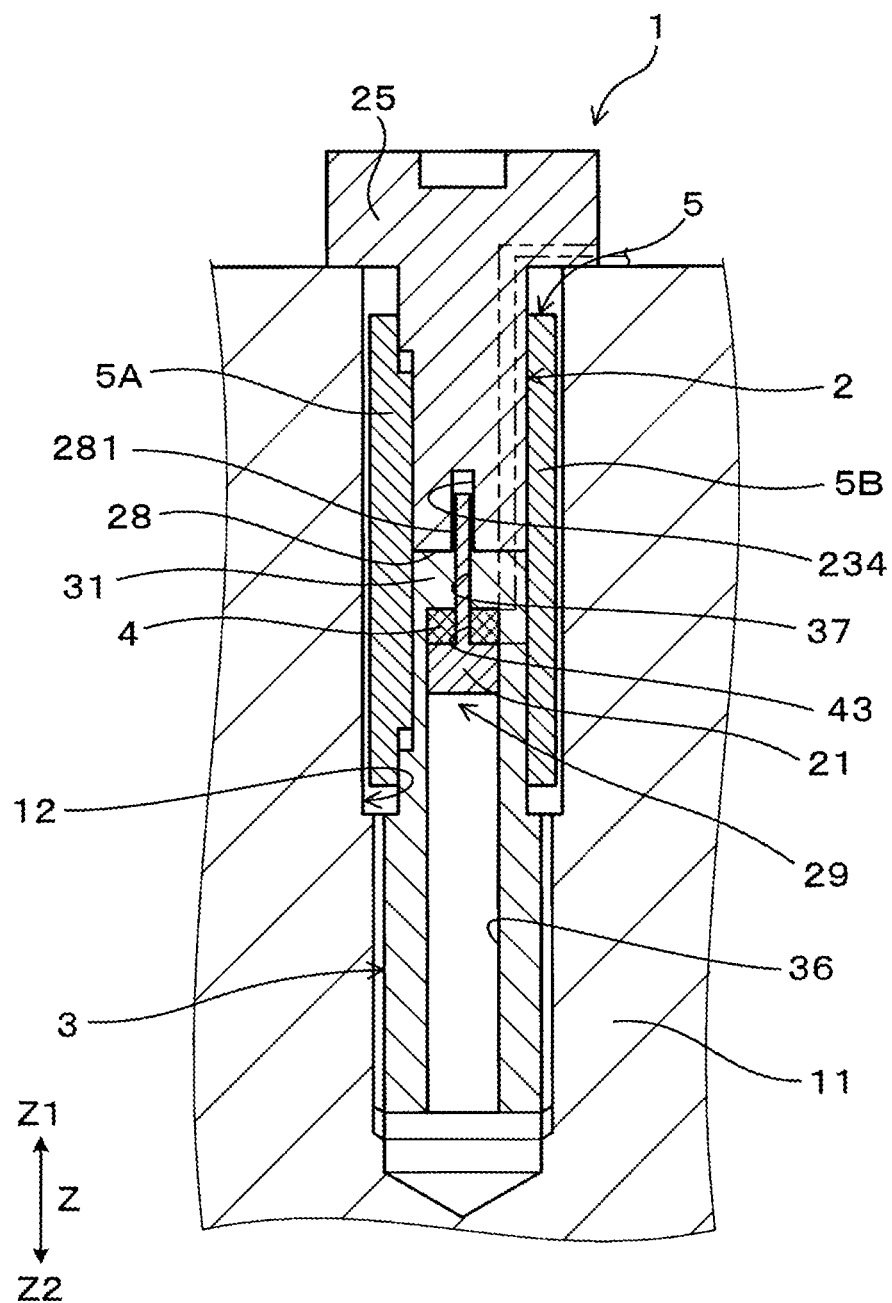
FIG. 14 is a longitudinal sectional view which illustrates a strain sensor of the fourth embodiment which is installed in a measuring target such as a cylinder head of an internal combustion engine.
Figure 15:
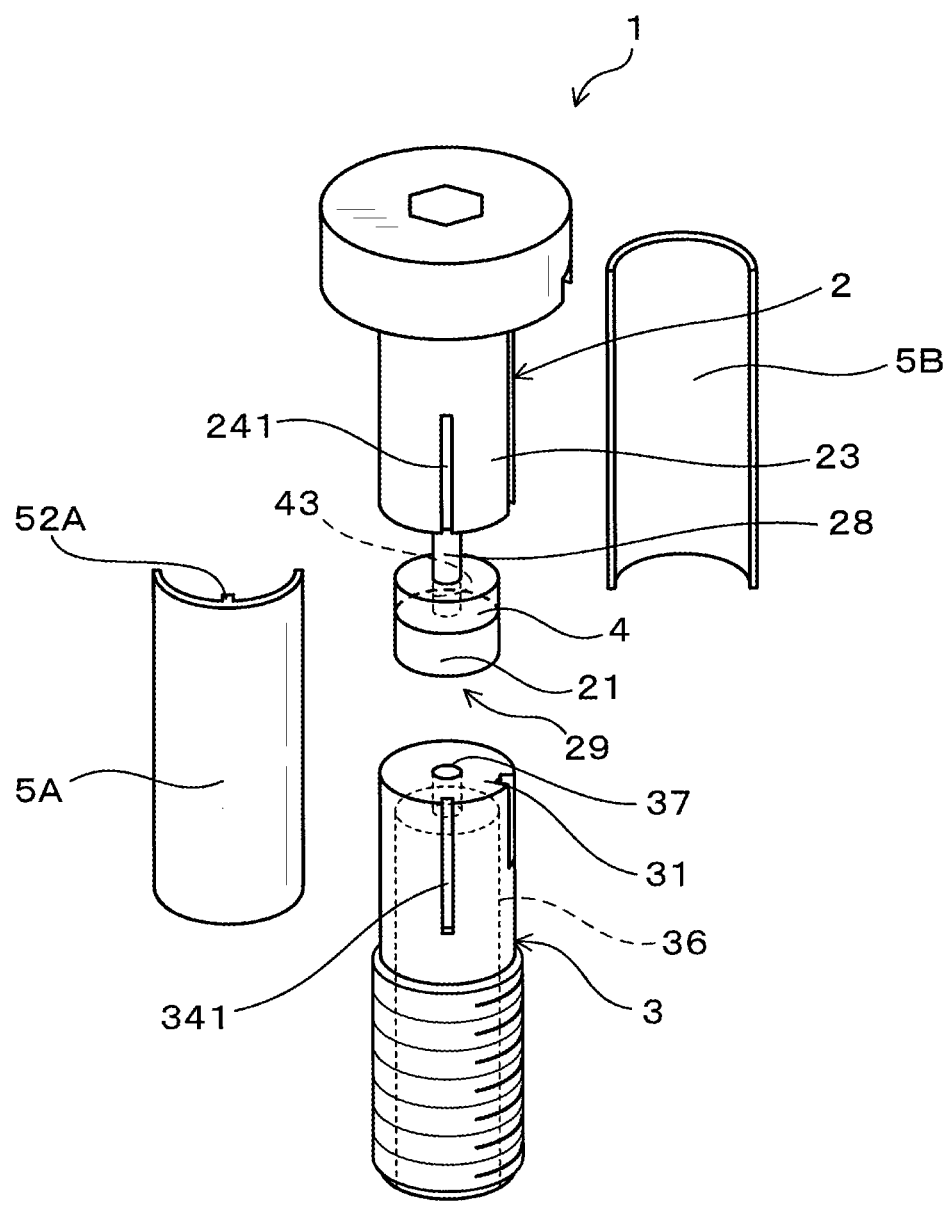
FIG. 15 is a perspective development view which illustrates an entire structure of a strain sensor of the fourth embodiment.

The second end portion 31 in this embodiment is, as illustrated in FIGS. 14 and 15, defined by a bottom of the center hole 36 formed in the second housing 3. The bottom is located on the base end side Z1 of the center hole 36. The second end portion 31 has formed therein the through-hole 37 extending through the thickness thereof. The hole 37 is smaller in diameter than the center hole 36. The first end portion 21 is located on the front end side Z2 of the first extended portion 28 inserted into the hole 37 formed on the front end side Z2 of the first housing 2. The first end portion 21 is of a cylindrical shape which has an outer diameter greater than that of the first extended portion 28 formed in the shape of a bar. The first end portion 21 is disposed in the center hole 36.

The first housing 2 includes the first end portion 21 and the first extended portion 28. A combination of the first end portion 21 and the first extended portion 28 defines or serves as the fastener 29 which is a discrete part separate from the first body 23. The pressure measuring mechanism 4 is arranged inside the center hole 36. The first end portion 21 of the fastener 29 is located on the front end side Z2 of the pressure measuring mechanism 4 within the center hole 36. The first extended portion 28 of the fastener 29 is disposed in the hole 37 and joined to the first body 23.

In the fastener 29, the first extended portion 28 is made of a cylindrical bar extending from the center of an end surface of the first end portion 21. The pressure measuring mechanism 4 is of an annular shape with the center hole 43. The first extended portion 28 of the fastener 29 is inserted into the center hole 43 of the pressure measuring mechanism 4. The first extended portion 28 has the external thread 281 formed on a front end thereof. The first body 23 of the first housing 2 has the internal thread 234 formed in the front end side Z2 of the first body 23. The internal thread 234 engages the external thread 281 to firmly retain the pressure measuring mechanism 4 between the first end portion 21 and the second end portion 31.

The installation of the strain sensor 1 in the cylinder head 11 is achieved by inserting the first extended portion 28 of the fastener 29 into the center hole 43 of the pressure measuring mechanism 4, arranging such an assembly of the fastener 29 and the pressure measuring mechanism 4 in the center hole 36 of the second housing 3, inserting the first extended portion 28 into the hole 37 of the second housing 3, and then tightening the external thread 281 of the first extended portion 28 to engage the internal thread 234 of the first body 23, thereby firmly securing the fastener 29 to the first housing 2. In this way, the pressure measuring mechanism 4 is firmly retained or nipped between the second end portion 31 of the second housing 3 and the first end portion 21 of the fastener 29.

Other arrangements of the strain sensor 1 are identical with those in the third embodiment.

The structure of the strain sensor 1 of this embodiment also offers the same advantages as in the third embodiment.

Figure 16:
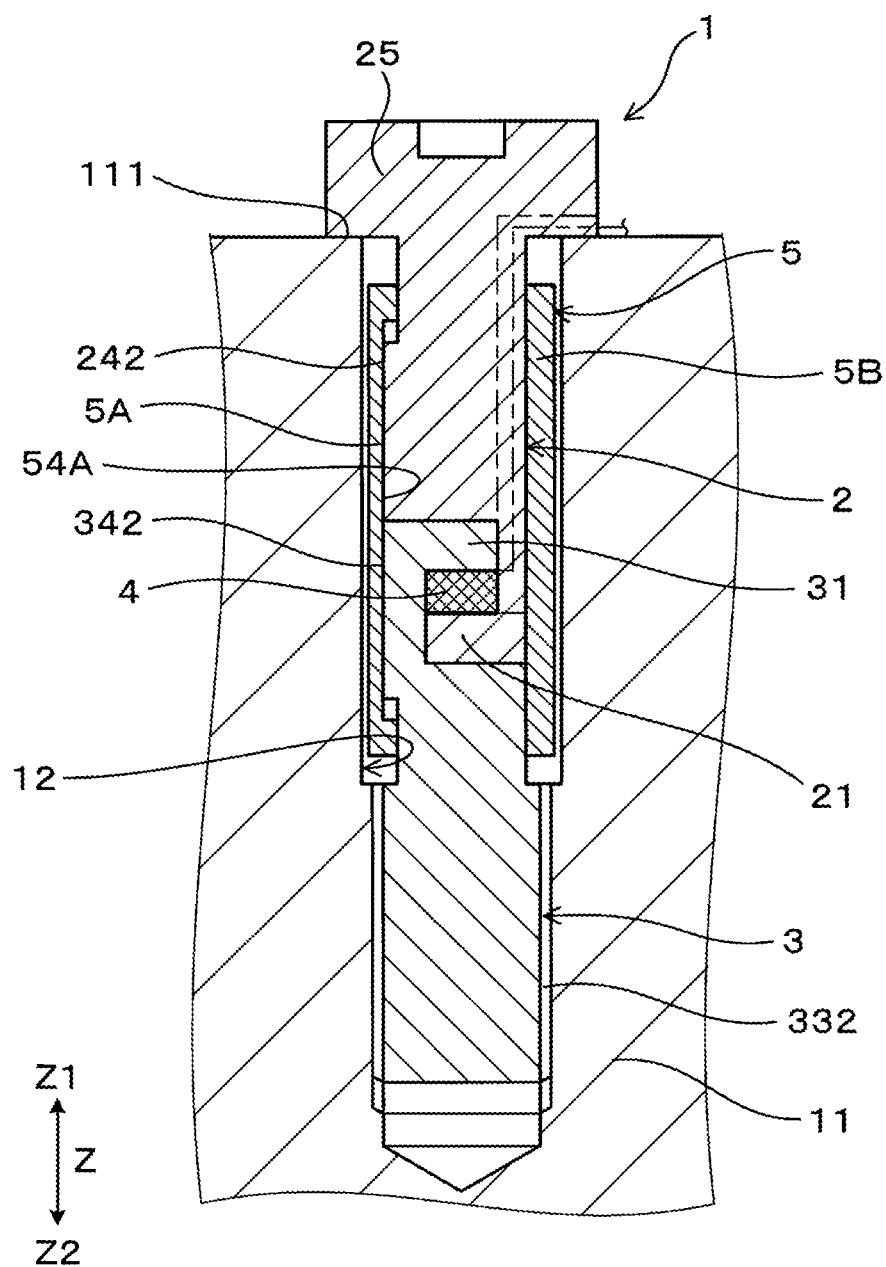
FIG. 16 is a longitudinal sectional view which illustrates a modified form of a strain sensor of the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims. For instance, the mount hole 12 may be, as illustrated in FIG. 2, formed as or defined by the communication hole 12A which leads to the combustion chamber 14. The protrusion 52A and the recesses 241 and 341 in the first embodiment may be modified as shown in FIG. 16. Specifically, the outer peripheral surface 24 of the first housing 2 and the outer peripheral surface 34 of the second housing 3 have formed thereon protrusions 242 and 342 which continuously extend in alignment with each other in the axial direction Z. In other words, the protrusions 242 and 342 are defined by a single ridge extending in the axial direction Z. The inner peripheral surface 51A of the cover semicylinder 5A has formed therein the recess 54A in the form of a groove. The recess 54A has a length extending in the axial direction Z. The protrusions 242 and 342 are fit in the recess 54A.

What is claimed is:

1. A strain sensor which is installed in a mount hole formed in a measuring target to measure a compressive strain occurring in the measuring target, the strain sensor having a length with a base end side and a front end side opposed to each other in an axial direction thereof, comprising:
   a first housing which has a length with a base end side and a front end side opposed to each other, the base end side being closer to an opening of the mount hole, the front end side being closer to a bottom of the mount hole, the first housing having a head which is formed on the base end side and placed on an end surface of the measuring target;
   a second housing which has a length with a base end side and a front end side opposed to each other, the base end side being closer to the opening of the mount hole, the front end side being closer to the bottom of the mount hole, the second housing being located closer to the front end side of the strain sensor than the first housing is and joined to the first housing, the second housing being in engagement with a thread formed in the mount hole; and
   a pressure measuring mechanism which is nipped by the first housing and the second housing, the pressure measuring mechanism having a base end side closer to the base end side of the strain sensor and a front end side closer to the front end side of the strain sensor,
   wherein the first housing has a first end portion located on the front end side thereof, the first end portion having a first face facing a front end surface of the pressure measuring mechanism which is located on the front end side of the pressure measuring mechanism,
   wherein the second housing has a second end portion located on the base end side thereof, the second end portion having a second face facing a base end surface of the pressure measuring mechanism which is located on the base end side of the pressure measuring mechanism, and
   wherein the pressure measuring mechanism is nipped between the first face and the second face and works to measure a change in compressive stress exerted by the measuring target on the first housing and the second housing in the axial direction of the strain sensor.

2. A strain sensor as set forth in claim 1, wherein the first housing has a first extended portion formed on the front end side thereof, the first extended portion having a front end facing the front end side of the strain sensor, wherein said first end portion is retained by the front end of the first extended portion in a cantilever form and extends in a first lateral direction perpendicular to the axial direction of the strain sensor, and wherein the second housing has a second extended portion formed on the base end side thereof, the second extended portion having a base end facing the base end side of the strain sensor, said second end portion being retained by the base end of the second extended portion in a cantilever form and extending in a second lateral direction opposite the first lateral direction.

3. A strain sensor as set forth in claim 2, wherein the first housing has at least two first extended portions which are formed on the front end side thereof and face each other in a lateral direction perpendicular to the axial direction of the strain sensor, the first end portion being retained by ends of the first extended portions, and wherein the second housing has at least two second extended portions which are formed on the base end side thereof and face each other in the lateral direction, the second extended portions extending in misalignment with the first extended portions in the axial direction of the strain sensor, the second end portion being retained by ends of the second extended portions.

4. A strain sensor as set forth in claim 1, wherein the first housing has formed therein a center hole with a bottom facing the front end side of the strain sensor, the first end portion being defined by the bottom of the center hole and having formed therein a through-hole which is smaller in diameter than the center hole of the first housing, and wherein the second housing has an extended portion which is formed on the base end side thereof and inserted into the through-hole of the first end portion, the second end portion being located closer to the base end side of the strain sensor than the extended portion is, the second end portion having an outer shape greater in size than that of the extended portion and being disposed inside the center hole of the first housing.

5. A strain sensor as set forth in claim 4, wherein the second end portion and the extended portion of the second housing serves as a fastener that is a discrete member separate from a body of the second housing, wherein the pressure measuring mechanism is disposed in the center hole of the first housing, wherein the second end portion of the fastener is located on the base end side of the pressure measuring mechanism within the center hole, and wherein the extended portion of the fastener is secured to the body of the second housing through the through-hole of the first end portion.

6. A strain sensor as set forth in claim 1, wherein the second housing has formed therein a center hole with a bottom facing the base end side of the strain sensor, the second end portion being defined by the bottom of the center hole and having formed therein a through-hole which is smaller in diameter than the center hole of the second housing, and wherein the first housing has an extended portion which is formed on the front end side thereof and inserted into the through-hole of the second end portion, the first end portion being located closer to the front end side of the strain sensor than the extended portion is, the first end portion having an outer shape greater in size than that of the extended portion and being disposed inside the center hole of the second housing.

7. A strain sensor as set forth in claim 6, wherein the first end portion and the extended portion of the first housing serves as a fastener that is a discrete member separate from a body of the first housing, wherein the pressure measuring mechanism is disposed in the center hole of the second housing, wherein the first end portion of the fastener is located on the front end side of the pressure measuring mechanism within the center hole, and wherein the extended portion of the fastener is secured to the body of the first housing through the through-hole of the second end portion.

8. A strain sensor as set forth in claim 1, wherein the first housing and the second housing are assembled integrally with a housing cover which surrounds entire circumferences of outer peripheries of the first housing and the second housing.

9. A strain sensor as set forth in claim 8, wherein the housing cover is made up of two discrete members which face each other in a direction perpendicular to the axial direction of the strain sensor in which the first housing and the second housing face each other.

10. A strain sensor as set forth in claim 9, wherein one of the discrete members of the housing cover has a protrusion which is formed on an inner periphery thereof and extends in the axial direction of the strain sensor, and wherein an outer periphery of the first housing and an outer periphery of the second housing have formed therein recesses which extend in alignment with each other in the axial direction, the protrusion being fit in the recesses.

11. A strain sensor as set forth in claim 9, wherein the first housing and the second housing have protrusions which are formed on outer peripheries thereof and extend continuously in alignment with each other in the axial direction of the strain sensor, and wherein one of the discrete members of the housing cover has formed in an inner periphery thereof a recess which extends in the axial direction and in which the protrusions are fit.

12. A strain sensor as set forth in claim 1, wherein the measuring target is an internal combustion engine, the mount hole being a communication hole leading to a combustion chamber of the internal combustion engine or a hole with a bottom formed adjacent the combustion chamber without communicating with the combustion chamber, and wherein the strain sensor works to measure a combustion pressure in the combustion chamber as a function of a compressive stress occurring in the internal combustion engine.

* * * * *